US012608962B2

(12) United States Patent
Belford et al.

(10) Patent No.: US 12,608,962 B2
(45) Date of Patent: Apr. 21, 2026

(54) SCHOOL FOOD AND BEVERAGE RECOGNITION AND PROCESSING SYSTEM

(71) Applicant: EduTrak, LLC, Bloomington, MN (US)

(72) Inventors: David Belford, Albany, MN (US); Jonathan Bondhus, Buffalo, MN (US)

(73) Assignee: Aristavue Inc., Issaquah, WA (US)

( * ) Notice: Subject to any disclaimer, the term of this patent is extended or adjusted under 35 U.S.C. 154(b) by 0 days.

(21) Appl. No.: 18/810,345

(22) Filed: Aug. 20, 2024

(65) Prior Publication Data

US 2025/0069418 A1     Feb. 27, 2025

Related U.S. Application Data

(60) Provisional application No. 63/578,092, filed on Aug. 22, 2023.

(51) Int. Cl.
| | |
|---|---|
| *G06V 20/68* | (2022.01) |
| *G06Q 20/20* | (2012.01) |
| *G06Q 20/40* | (2012.01) |
| *G06V 10/12* | (2022.01) |
| *H04N 7/18* | (2006.01) |
| *H04N 23/90* | (2023.01) |

(52) U.S. Cl.
CPC ........... *G06V 20/68* (2022.01); *G06Q 20/208* (2013.01); *G06Q 20/40145* (2013.01); *G06V 10/12* (2022.01); *H04N 7/188* (2013.01); *H04N 23/90* (2023.01)

(58) Field of Classification Search
None
See application file for complete search history.

(56) References Cited

U.S. PATENT DOCUMENTS

| | | | | |
|---|---|---|---|---|
| 10,133,933 | B1 * | 11/2018 | Fisher | G06V 20/41 |
| 10,157,413 | B2 * | 12/2018 | Landers, Jr. | G01B 11/00 |
| 11,393,213 | B2 * | 7/2022 | Liu | G06V 40/173 |
| 11,908,288 | B2 * | 2/2024 | Cleper | G06K 7/1413 |
| 12,380,488 | B2 * | 8/2025 | Morgan | G06Q 30/0637 |
| 2018/0096332 | A1 * | 4/2018 | O'Herlihy | G08B 21/182 |
| 2018/0240090 | A1 * | 8/2018 | Yokoyama | G06Q 20/4014 |
| 2019/0156506 | A1 * | 5/2019 | Fisher | G06T 7/70 |
| 2019/0236362 | A1 * | 8/2019 | Srivastava | G06F 18/24137 |
| 2020/0074432 | A1 * | 3/2020 | Valdman | G07G 5/00 |
| 2022/0076228 | A1 * | 3/2022 | Eger | G07G 1/0063 |
| 2024/0220957 | A1 * | 7/2024 | Patil | G06T 7/194 |

(Continued)

*Primary Examiner* — Daniel T Tekle
(74) *Attorney, Agent, or Firm* — Sheridan Ross PC

(57) ABSTRACT

A school food and beverage recognition and processing system includes a self-checkout system that attaches to a school meal line. The self-checkout system uses multiple cameras to obtain images of a student for identification and images of a meal, identify contents of the meal, and determine whether the meal qualifies for reimbursement through a health program or agency. In addition to determining meal reimbursement qualifications, the self-checkout system tracks the meals and items sold for inventory and purchasing purposes. The self-checkout system sends reports to the school or administration agency including reimbursement information, inventory information, and customer information. This information is used to update a student's prepaid school meal account and track transactions.

20 Claims, 14 Drawing Sheets

(56) References Cited

U.S. PATENT DOCUMENTS

| | | | |
|---|---|---|---|
| 2024/0331378 A1* | 10/2024 | Shi | G06T 7/248 |
| 2025/0005651 A1* | 1/2025 | Morgan | G07G 1/0009 |
| 2025/0069418 A1* | 2/2025 | Belford | G06V 20/52 |
| 2025/0225496 A1* | 7/2025 | Shevstov | G06Q 20/145 |

\* cited by examiner

SCHOOL FOOD AND BEVERAGE RECOGNITION AND PROCESSING SYSTEM

CROSS-REFERENCE TO RELATED APPLICATIONS

The present application claims the benefit of and priority, under 35 U.S.C. § 119 (c), to U.S. Provisional Application Ser. No. 63/578,092, filed on Aug. 22, 2023, entitled "SCHOOL FOOD AND BEVERAGE RECOGNITION AND PROCESSING SYSTEM," the entire disclosure of which is hereby incorporated herein by reference, in its entirety, for all that it teaches and for all purposes.

BACKGROUND

The present disclosure is generally directed to a meal identification and processing system, in particular, toward a system that identifies contents of a meal, processes information about the meal, identifies a person with the meal, determines a charge for the meal to be associated with the person, and tracks components of the transaction for the school and governmental entities.

Currently, students or school workers (customers) purchasing a school meal go through a meal line to pick out their food and pay for their meal by charging their account. At the end of the line, a human identifies the customer, identifies the meal, and charges the customer's account for that meal and any additional items. Additionally, information about the number of meals, components of each meal, and customer information is stored by the school for government subsidies, reimbursements, and other tracking purposes, such as inventory.

Requiring a human to input information about the meal and/or the purchaser at the end of the line is time consuming and prone to errors. Moreover, schools are required to maintain specific records about school meals and such records are time consuming to log/track, prepare, and save, especially when created by a human.

BRIEF SUMMARY

Due to the numerous limitations associated with the existing systems described above, the following disclosure describes an improved self-checkout method and system for students and school employees (i.e., customers) to use when purchasing a school meal. Note that the school meal can be breakfast, snack, lunch, or dinner.

This novel self-checkout method and system for school meals significantly improves the accuracy of the information tracked and stored by school, and increases the speed of the line and checkout process as compared to current school meal checkout methods and systems. Although the present disclosure is directed to a self-checkout system in a school cafeteria, it is understood the present disclosure could be applied to other environments outside of a school cafeteria.

It is one aspect of embodiments of the present disclosure to provide a self-checkout method and system for customers to use when purchasing a school meal that can capture the data quickly, accurately, and inexpensively. Accordingly, various embodiments of the present disclosure provide a system and method that allows for fast and easy processing of school food serving lines where customers are passed through a checkpoint, images are taken of their food tray and face, and the images are processed to accurately charge the customer, track and analyze the information required by the government, and track and analyze the information needed by the school. In some embodiments, the images are processed to determine what items were on the customer's tray in at least two ways: (1) manual processing at a processing user interface ("UI") station, and/or (2) using Artificial Intelligence ("AI"). One advantage of the system is that a human has the option to review decisions made by the AI (to verify and/or improve the AI model) or if the AI cannot determine what the food or meal is, the system can mark the image for review. The processed data is then sent back to the school's food service software system which then adjusts records and balances. In some embodiments, archives are kept of the images for viewing trays or customers during an audit or at the request of a parent.

In some embodiments, the self-checkout system point of sale ("POS") system will send information or otherwise communicate with the EduTrak Server Core ("ESC") system. The ESC system is a device that is either hosted locally at the school or in the cloud if the school desires to not host it themselves. This device communicates with the EduTrak cloud environment using Databridge encrypted bidirectional syncing technology, a proprietary bidirectional synchronization method. The ESC device, or system, is used to maintain a school's lunch lines and handles transactions from lunch service, while also keeping a copy of students and other vital data locally, synchronized with the cloud. This allows for a school district to keep functioning even in the event of an internet outage. In one embodiment, the processor/controller will use a hypertext transfer protocol ("HTTP") based application programming interface ("API") to communicate with the ESC. The controller will reach out to the ESC, for example, to pull files and metadata from the ESC. The POS processing system is the controller and components in the controller enclosure, which is attached to and part of the physical self-checkout system. In some embodiments, there will also be an API to allow the POS controller to be controlled remotely from the ESC system. In these embodiments, communication may be performed through a secure shell protocol ("SSH") tunnel. In one embodiment, communications may be performed by polling the API on the ESC system for a list of commands, or through other means of communication such as a message queue system or pub/sub system.

The National School Lunch Program ("NSLP") from the United States Department of Agriculture ("USDA") requires specific items to be served and included on a student's tray to be considered a "meal." Additionally, the meal must comply with NSLP requirements for claims, funding, subsidies, reimbursement, etc. Embodiments of the present system can verify those items such that schools are able to make accurate claims and set proper student account balances. The NSLP is considered a pre-pay program where parents not receiving government benefits are expected to prepay and have funds in the student's account. The validation of purchase prices is not important at the time of purchase, which is different than a typical or normal retail environment. This is because the school knows who is buying the meal and the accounts are prepaid, therefore, the processing can occur later. Accounts are also permitted to go negative if ample funds are not on the pre-paid account.

For all school levels, base meals (e.g., meals including a protein, a starch, a vegetable, a fruit, and milk) are reimbursable and additional items are not reimbursable. Typically for elementary students, the only possible reimbursable options are milk or a meal. Milk alone is not a meal and the meal must be a base meal to be reimbursable. For higher level grades (e.g., middle school and high school), a meal itself is reimbursable, but additional items like juice, fruit cups, etc. are not reimbursable. Therefore, the software and inputs may look different for a system installed at an elementary school versus a high school. In the high school, for example, the software will have to determine what is an "additional item" on the student's tray. Whereas in an elementary school, the system merely has to determine if there is food (i.e., it is a meal) or if the customer only has milk. However, in both scenarios, the system of the present disclosure can validate that the student's tray has all of the necessary components to be considered a reimbursable meal, as defined by the NSLP and USDA.

It is one aspect of embodiments of the present disclosure to provide a self-checkout method and system with delayed processing capabilities to reduce the size of the on-site system and size of the data storage and processing systems. For example, in some embodiments, feeding the data to the ESC (i.e., the EduTrak Server Core) and having delayed processing allows for significant reduction in the amount of computer power needed on the actual POS device, e.g., the controller and components in the controller enclosure.

Additionally, embodiments of the present disclosure enable delaying processing of reimbursability decisions, i.e., determining whether the meal or item is reimbursable or not, because reimbursement requests are not sent from the school to the government in real time. For example, processing decisions can be made either on the ESC or in the cloud, which enables the system to continue functioning even if the school loses internet connectivity as long as they have a local ESC box. Moreover, by delaying processing, the system can more easily handle third party processing queues, meaning the self-checkout system software does not have to respond in real time. Rather, the third parties can send the system large amounts of data that is processed when the system is able to process such data.

Another advantage of delaying processing and duplicating the data in multiple places is that it increases reliability of the system, for example if there is an internet outage or power outage at the POS (e.g., specific school self-checkout) system. Embodiments of the present disclosure include an assembly that leverages mechanical components, cameras, processors, server components, and cloud services to complete the stack. Among other things, having a queue in both the cloud and the ESC allows greater reliability and more flexibility for where processing is conducted, which also improves privacy and case of use. In some embodiments, a battery may be included in the POS system. For instance, the battery may be attached or included in the controller enclosure. Because the unit uses a low amount of power, the unit can easily run all day on battery power. In some embodiments, the battery may correspond to a smartphone rechargeable battery bank. This rechargeable battery is able to be charged (e.g., overnight, etc.) and then the whole unit may be used wirelessly, with no need to be wired in.

It is another aspect of embodiments of the present disclosure to provide a self-checkout method and system for customers to use when purchasing a school meal that eliminates staffing of school meal lines such that the school can save money or repurpose staffing from a traditional POS role. In some embodiments, the user interface at the POS may be presented as an android or robot to provide a human aspect to the customers at the capture point. The camera cover could have an animal costume to look less scary to children.

It is one aspect of embodiments of the present disclosure to provide a self-checkout method and system for customers to use when purchasing a school meal that attaches to any typical school meal serving line or rail. Moreover, embodiments of the present disclosure are Americans with Disabilities Act ("ADA") compliant for students with hearing or visual impairments or students needing a wheelchair or other walking assistance. Many embodiments include sound and visual indicators for customers.

Another aspect of some embodiments of the present disclosure include basic sound and visual cues to direct customers through the self-checkout line quickly and efficiently. In some embodiments, colored lights are used in combination with different chimes or sounds, one or more screens, and/or a scale. It is another aspect of embodiments of the present disclosure to provide a self-checkout method and system for customers to use when purchasing a school meal that is light weight and can be deployed in existing cafeterias and school food lines easily and inexpensively. This is possible in part because the data is processed offsite and, in some embodiments, not in real time. Other embodiments may process the data in real time if requested by the school. Additionally, the system can bolt onto existing tray rails and does not require a full cabinet or new checkout lines.

It is one aspect of embodiments of the present disclosure to provide a self-checkout method and system for customers to use when purchasing a school meal that provides a complete record of all auditable data including, but not limited to, tray images, lists of food, items sold, customer face images, and dates and locations of services.

It is an aspect of embodiments of the present disclosure to provide a self-checkout method and system for customers to use when purchasing a school meal that can process school food serving lines in both directions, e.g., the direction can be reversed by reversing the components.

Another aspect of various embodiments of the present disclosure is to provide a self-checkout method and system for customers to use when purchasing a school meal that can identify the customer using a variety of methods and devices. For example, the customer could type in their student identification or personal identification number ("PIN"), a fingerprint scanning device could be used by the customer, the customer could use a card that swipes, scans, or has radio-frequency identification ("RFID") capabilities, and/or the customer could be identified using facial recognition software and a camera.

It is one aspect of various embodiments of the present disclosure to provide a self-checkout method and system for customers to use when purchasing a school meal that uses facial recognition to identify a customer (e.g., student) at the serving line and connect that customer with an account. In some embodiments, the front facing camera will take a picture of the customer and send the image to the processor to process the image and identify the customer using facial recognition software. One advantage of this aspect is that it would eliminate user input of a student identification or other input methods at the serving line. Therefore, students do not have to memorize a PIN or hold onto a card. This aspect also reduces potential fraud on a customer, e.g., one customer using another customer's identification without approval from the identification owner. However, some embodiments may not include a front facing camera. Additionally, the camera/lenses may be interchangeable and may have adjustable orientation (e.g., landscape or portrait). In embodiments, the cameras may have wide angle lenses. The field of view (FOV) may be up to 110 degrees, depending on the configuration.

It is one aspect of embodiments of the present disclosure to provide a self-checkout method and system for customers to use when purchasing a school meal that uses image recognition software integrating data regarding daily menus and/or menu items to reduce the processing time and power needed to identify items on the customer's tray, determine if the meal is reimbursable, and/or determine if additional items are present. In some embodiments, the system uses menu scheduling data to limit available items for AI processing, meaning the AI processing software only has to determine if the item is one of four (or any number) specific items on the menu. Knowing the limited food options each day enables the system to much more selectively filter down what items are possible, enhancing AI object recognition reliability. Information about the daily menus may be received from a database, inputted directly, obtained from a third-party database or system, etc.

In embodiments, an API connects customer systems with the self-checkout method and system of the present disclosure. In embodiments, the information (e.g., images of food, student information, etc.) may be stored in the ESC or in a cloud system via a Databridge encrypted bidirectional syncing API. Additionally, in embodiments, the processing of the information is delayed. Delayed processing has several advantages, such as avoiding a bottleneck in the line. If the information is processed in real-time there would be a time constraint to all processing (e.g., each transaction must be processed in less than five seconds to keep the food and checkout line moving). Additionally, the system may require an Internet connection, and outages would cause the checkout line to go down. In contrast, in embodiments, the information may be stored locally and uploaded as a batch at the end of each day or shift. In some embodiments, the information may be uploaded as a batch at predetermined increments during a shift, for example, every 15 minutes or after 20 transactions. Alternatively, the information may be uploaded after every transaction. In order to handle real-time information processing, the system would also require additional computer power (e.g., processing and memory), which would increase the complexity and cost of the system. Perhaps most importantly, because the processing would have to be finalized in seconds, there would be no ability for human oversight/review.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1A:
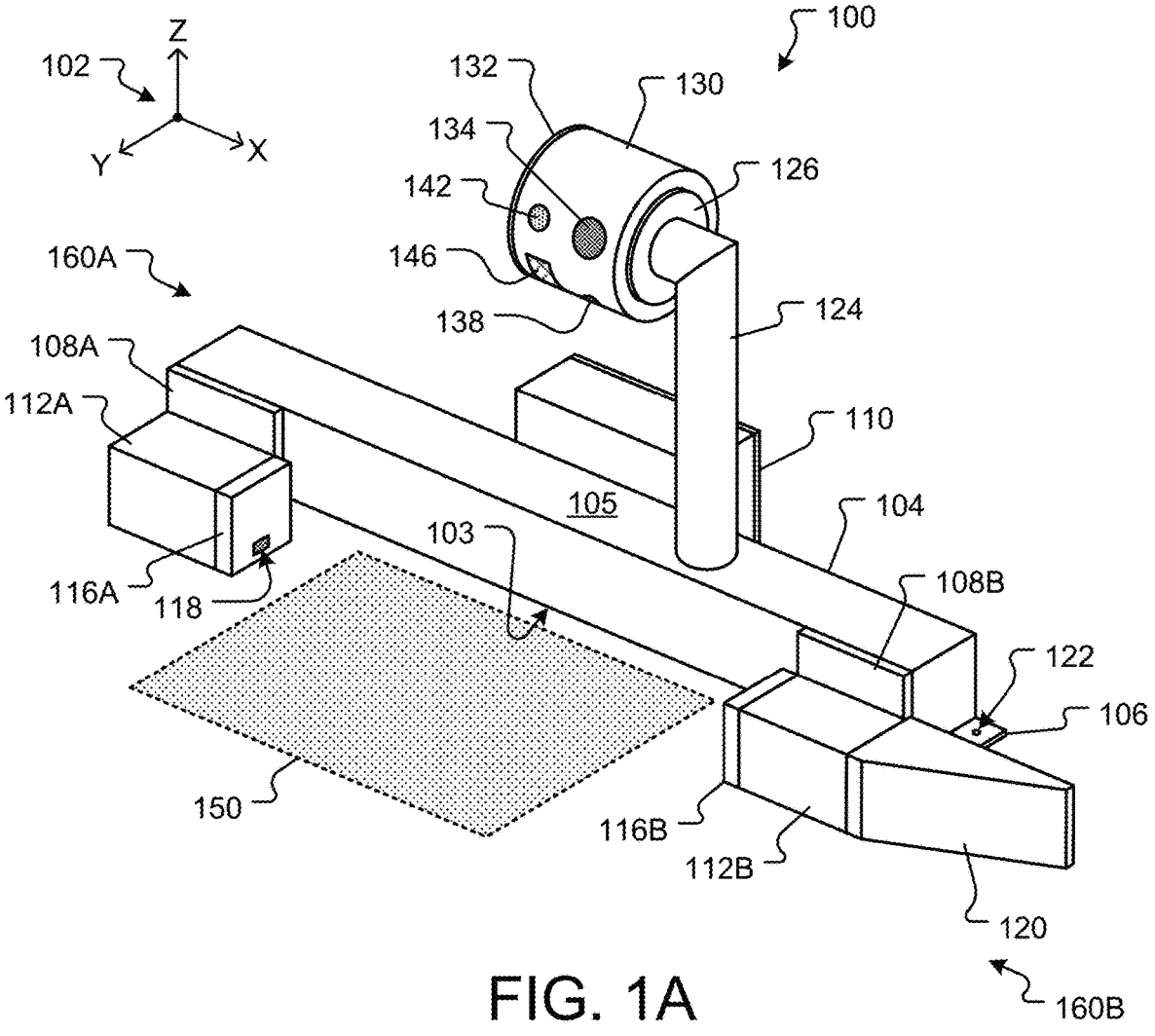
FIG. 1A shows a schematic perspective view of the self-checkout system for identifying and processing a meal in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

It is with respect to the above issues and other problems that the embodiments presented herein were contemplated.

Figure 1B:
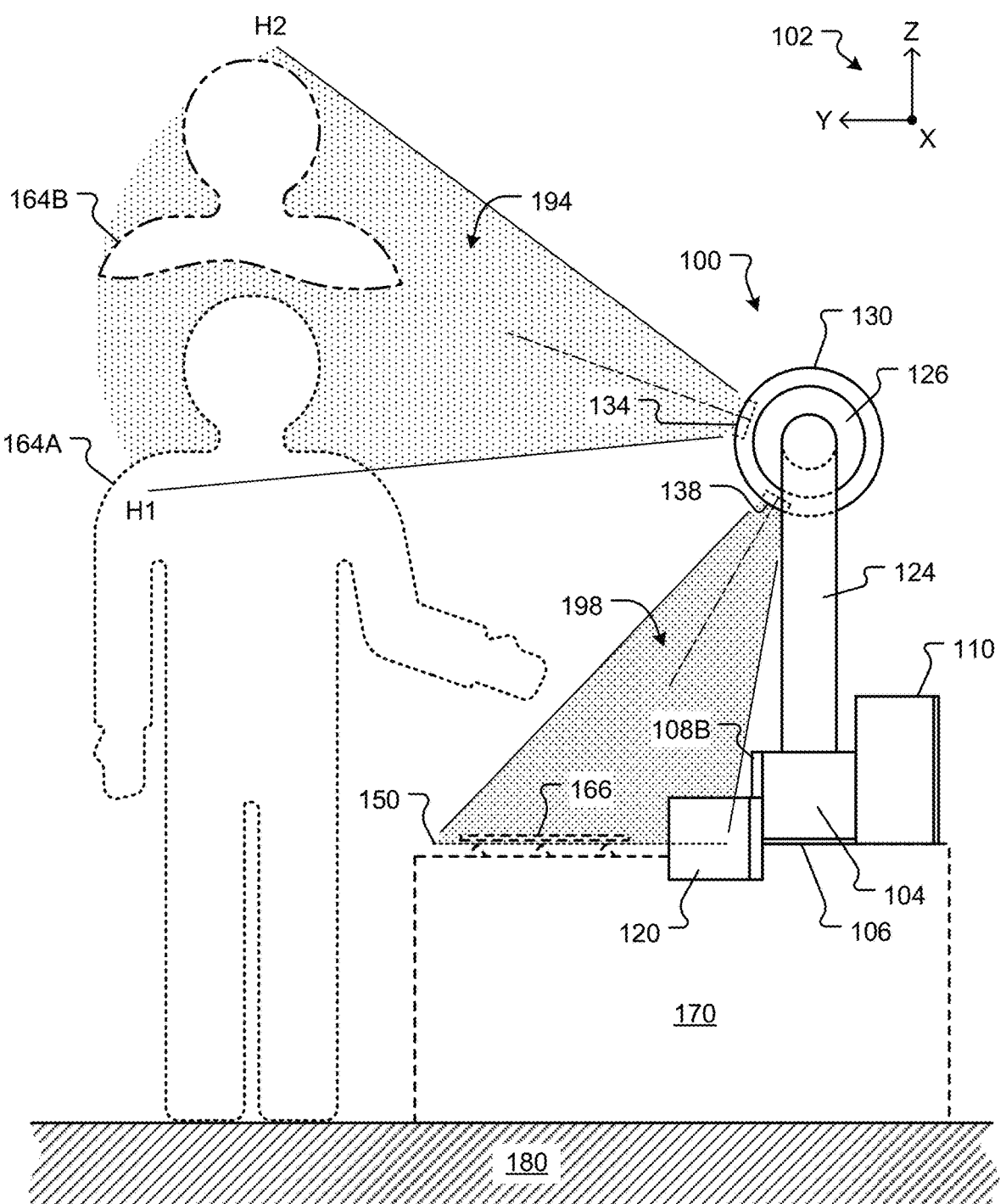
FIG. 1B shows a side elevation view of the self-checkout system of FIG. 1A in a school environment illustrating a viewing angle of the image sensors of the self-checkout system in accordance with embodiments of the present disclosure.

Referring initially to FIGS. 1A and 1B, various views of a self-checkout system 100 are shown in accordance with embodiments of the present disclosure. The self-checkout system 100 may correspond to an assembly of components, or machine, that can be incorporated into a school cafeteria or meal line, for example, in place of a conventional POS checkout. The self-checkout system 100 may be a part of a school food and beverage recognition and processing system. The school food and beverage recognition and processing system may include a plurality of distributed self-checkout systems 100 deployed and/or installed in multiple locations, checkout lines, schools, states, etc.

Features of the self-checkout system 100 may be described in conjunction with a coordinate system 102. The coordinate system 102, as shown in the figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the self-checkout system 100. These planes may be disposed orthogonally, or at 90 degrees, to one another. While the origin of the coordinate system 102 may be placed at any point on or near the components of the self-checkout system 100, for the purposes of description, the axes of the coordinate system 102 are always disposed along the same directions from figure to figure. In some examples, reference may be made to dimensions, angles, directions, relative positions, and/or movements associated with one or more components of the self-checkout system 100 with respect to the coordinate system 102. For example, the width of the self-checkout system 100 may be defined as a dimension along the X-axis of the coordinate system 102, the depth of the self-checkout system 100 may be defined as dimension along the Y-axis of the coordinate system 102, and the height of the self-checkout system 100 may be defined as a dimension along the Z-axis of the coordinate system 102. Additionally or alternatively, the width, depth, and height of the components (e.g., subcomponents) of the self-checkout system 100 may be similarly defined along the same axes of the coordinate system 102.

The self-checkout system 100 may include a main frame 104 extending (e.g., a width) from a left-hand side 160A of the self-checkout system 100 to a right-hand side 160B of the self-checkout system 100. The main frame 104 may be made from a section of tubing (e.g., rectangular tubing, etc.) and may be hollow or include an interior space through which cables, wiring, and other components may be arranged. The main from 104 may be made from steel, aluminum, plastic, composite, etc., and/or combinations thereof. In one embodiment, the main frame 104 may include welded, glued, or formed endcaps attached to each end of the main frame 104, for example, preventing unauthorized access to any components disposed inside the main frame 104. The main frame 104 may be configured to attach or mount to a school meal line at, or adjacent, a base surface 103 of the self-checkout system 100. For instance, a mount plate 106 may be attached to each side of the main frame 104 adjacent a base surface 103 of the main frame 104. Each mount plate 106 may include one or more mount holes 122 that are configured to receive a bolt, screw, or other fastener. In one embodiment, a bolt may be inserted through one or more of the mount holes 122 of the mount plates 106 and into an existing meal line support surface.

The self-checkout system 100 includes a left enclosure 112A and left mount flange 108A attached to the main frame 104 at the left-hand side 160A. The left enclosure 112A may be configured to house or interface with one or more components including, but in no way limited to, the left end cap 116A and the sensor 118 (e.g., tray detection sensor, etc.). The left mount flange 108A may be affixed to the main frame 104 via a welded, fastened, or formed interface. In some embodiments, the left enclosure 112A (and any components attached thereto) may be adjusted in height (e.g., along the Z-axis) relative to the main frame 104 by one or more adjustable or slotted interfaces between the left enclosure 112A and the left mount flange 108A. In this manner, the left enclosure 112A, left end cap 116A, and sensor 118 may be adjusted to suit a height of a tabletop, meal line surface, meal line rails, etc. In some embodiments, the left end cap 116A and the right end cap 116B may include a sensor 118 (e.g., in a light beam sensing configuration, etc.). As can be appreciated, the left end cap 116A and right end cap 116B may be substantially similar, if not identical in construction and arrangement.

The self-checkout system 100 includes a right enclosure 112B and right mount flange 108B attached to the main frame 104 at the right-hand side 160B. The right enclosure 112B may be configured to house or interface with one or more components including, but in no way limited to, the right end cap 116B and the tray guide 120. Similar to the left mount flange 108A, the right mount flange 108B may be affixed to the main frame 104 via a welded, fastened, or formed interface. In some embodiments, the right enclosure 112B (and any components attached thereto) may be adjusted in height (e.g., along the Z-axis) relative to the main frame 104 by one or more adjustable or slotted interfaces between the right enclosure 112B and the right mount flange 108B. In this manner, the right enclosure 112B, right end cap 116B, and tray guide 120 may be adjusted to suit a height of a tabletop, meal line surface, meal line rails, etc.

The enclosures 112A, 112B may be made from a section of tubing (e.g., rectangular tubing, etc.) and may be hollow or include an interior space through which cables, wiring, and other components may be arranged. The enclosures 112A, 112B may be made from steel, aluminum, plastic, composite, etc., and/or combinations thereof. In one embodiment, the left end cap 116A and the right end cap 116B may be attached to an open end of the left enclosure 112A and right enclosure 112B, respectively. The end caps 116A, 116B may include a stepped portion (or protrusion) that inserts into an open end of the enclosures 112A, 112B via a slip or press fit. This stepped portion may be configured to substantially match a size and shape of the interior of the enclosures 112A, 112B. In one example, the end caps 116A, 116B may be attached to the enclosures 112A, 112B via one or more fasteners. Additionally or alternatively, the end caps 116A, 116B may be glued to the enclosures 112A, 112B, respectively.

In some embodiments, a tray viewing window 150 may be arranged between the left enclosure 112A and the right enclosure 112B (e.g., in front of the main frame 104). This tray viewing window 150 may correspond to a tray viewing area of the downward image sensor 138 of the self-checkout system 100 (described in greater detail in conjunction with FIG. 1B). Additionally or alternatively, the tray viewing window 150 may define a space in which a tray (e.g., including a meal, etc.) is placed for identification and processing by the self-checkout system 100, as described herein.

As illustrated in FIG. 1A, the left enclosure 112A includes a left end cap 116A and a sensor 118. The sensor 118 may be disposed on or at least partially inside the left end cap 116A such that a sensing area of the sensor 118 faces toward a center of the self-checkout system 100. In some embodiments, when a tray is placed in the tray viewing window 150, or in the area between the left enclosure 112A and right enclosure 112B, the sensor 118 may detect a presence of the tray and initiate, or trigger, the identification and processing method performed by the self-checkout system 100 and the school food and beverage recognition and processing system. Examples of the sensor 118 may include, but are in no way limited to, one or more of an image sensor, an infrared sensor, ultrasonic sensor, a laser sensor, a light sensor, a proximity sensor, and/or any other sensor capable of detecting an object in a detection area of the sensor 118.

For trays 166 that are not black in color, for example, either one or two sensors 118 may be used to detect when the tray is proximate to them (e.g., within an inch or two, depending on the calibration of the sensors 118). If either sensor 118 triggers, the processes described herein may initiate. In some embodiments, the at least one sensor 118 may be required to stay tripped (in a detect state) to complete the transaction. For instance, if the tray 166 is removed, the process may be required to start over.

For trays that are black in color, for example, an infrared sensor may have difficulty detecting (e.g., seeing) the tray 166. In this approach, two sensors 118 (e.g., infrared sensors) may be used to provide a light beam that must be broken to block the two infrared sensors from shining on each other. This may be referred to herein as "black tray mode," which generally states that for school lunch lines utilizing black trays, since the infrared sensors may have difficulty seeing the tray 166, the self-checkout system may be configured with two sensors 118, not just one. In some embodiments, these two sensors 118 may face across the tray viewing window 150 and be disposed in the left end cap 116A and the right end cap 116B creating a light beam therebetween and through the tray viewing window 150. One advantage to this approach is the ability to quickly setup two sensors without precise alignment (since the alignment is built into the end caps 116A, 116B) and there is no need to setup an alignment of a laser sensor, for example, to precisely hit a target. Moreover, since children may knock the self-checkout system 100, or bump into the sensor 118, with a multiple sensor approach for the black tray mode, two infrared sensors may be used as the sensor 118 and reliability of the self-checkout system 100 is enhanced.

The right enclosure 112B shown in FIG. 1A includes a tray guide 120 attached to the right enclosure 112B on the right-hand side 160B of the self-checkout system 100. The tray guide 120 may comprise an angled surface that guides or directs a tray into a waiting position before reaching the tray viewing window 150. The tray guide 120 may be made from metal, plastic, composites, etc., and/or combinations thereof. In one embodiment, the tray guide 120 may be made from a low friction material such as polytetrafluoroethylene ("PTFE"), homopolymer acetal, thermoplastic, high-density polyethylene ("HDPE"), low-density polyethylene ("LDPE"), and/or the like. In one embodiment, the tapered or angled surface of the tray guide 120 may be coated with a non-stick, or low-friction, material (e.g., such as PTFE, etc.). Additionally or alternatively, a low-friction material (e.g., plastic, etc.) may be applied to the tapered or angled surface of the tray guide 120 as an adhesive tape or label. In this example, as the low-friction material wears, the adhesive tape or label can be removed and replaced. In one embodiment, the tray guide 120 may be made from aluminum and may be anodized (e.g., hard anodized, etc.) providing a low-friction contact surface for a tray.

Although shown in a right-to-left configuration in FIG. 1A, embodiments of the self-checkout system 100 are not so limited. The tray guide 120 may include a similar, if not identical, attachment feature (e.g., stepped portion, etc.) to the end caps 116A, 116B (as described above), that allows the tray guide 120 to attach to an open end of either enclosure 112A, 112B. For instance, the tray guide 120 may be moved from the right enclosure 112B to the left enclosure 112A, etc., (e.g., on the left-hand side 160A of the self-checkout system 100) to arrange the self-checkout system 100 in a left-to-right configuration.

As a user moves a tray 166 along the tray support 170, the tray guide 120 may push/guide the tray 166 outwardly and away from the self-checkout system 100 (e.g., toward a user). Among other things, this allows a user at the self-checkout system 100 to position their tray 166 into the tray viewing window 150 without another user's tray 166 contacting or jamming the self-checkout system. In one embodiment, the tray guide 120 pushes the tray 166 toward the user and then, when the user is ready to checkout, the user must move the tray 166 toward the self-checkout system 100 in the tray viewing window 150. The user can then authenticate by, for example, inputting or otherwise providing their identification or account information, with at least one of an RFID reader, a keypad, a barcode, a magstripe, and/or a biometric identification (e.g., fingerprint or facial recognition through the forward image sensor 134, etc.). In some embodiments, as described herein, the indicator 142 may change from red to green (when authenticated). The indicator 142 may indicate that the self-checkout system 100 is ready and the user can proceed to put their tray 166 in the image taking area, or tray viewing window 150, between the left enclosure 112A and the right enclosure 112B. The customer then pushes their tray 166 into the tray viewing window 150, into the sensing area of the sensor 118, and causing the self-checkout system 100 to output an alert sound via the audio output device 146. A picture of the customer's tray 166—and possibly the user (e.g., student) depending on the specific school settings—will be taken by the forward image sensor 134. The light of the indicator 142 may change from green to red once the tray/food picture is taken and sent to the processor 204 for further processing. At this point, the user can now leave the self-checkout system 100 with their tray 166 and food. In some embodiments, metadata will be created by the self-checkout system 100, identified by a universal unique identifier ("UUID"). The data can then be processed offsite (e.g., via a server, etc.) or onsite depending on the specific school's preferences. Such processing may include noting which user account to charge for the meal, if the meal includes any extras requiring an additional charge, determining whether the food qualifies as a "meal" under the NSLP requirements, tracking the total number of meals sold, tracking the total number of partial meals sold, tracking the total free and reduced lunch students for which additional funding can be requested, tracking the total number of paying customers for partial government subsidies, etc.

The self-checkout system 100 includes a controller enclosure 110 attached to a rear side of the main frame 104. The controller enclosure 110 may include a main body with a rear wall portion and four sidewalls extending from the rear wall portion. A controller (e.g., processor, memory, etc.) of the self-checkout system 100 is positioned in the main body of the controller enclosure 110 and a lid or cover is positioned on top of the main body of the controller enclosure 110. The cover may be removably secured to the main body via one or more standoffs or fasteners. The main body and/or the cover of the controller enclosure 110 may include openings (e.g., vents, etc.) that permit hot air from the controller (e.g., processor, memory, etc.) to escape the controller enclosure 110. The main body may include a plurality of openings for various wires, cables, power cords, etc. to enter the controller enclosure 110 and/or pass from the controller enclosure 110 to the other components of the self-checkout system 100 (e.g., forward image sensor 134, downward image sensor 138, indicator 142, audio output device 146, etc.). The controller enclosure 110 may include ports for universal serial bus ("USB"), USB-C, lightning, high-definition multimedia interface ("HDMI"), Display-Port ("DP"), network interface connectors, RJ-45, and/or other connections. These connections may allow information to transfer to and from the self-checkout system 100 (e.g., to other components, servers, etc., in the school food and beverage recognition and processing system). In one example, a qualified user can retrieve, process, and/or store the data received by the controller via one or more of these connections.

The self-checkout system 100 includes a head unit 130 that is attached to the main frame 104 via a support arm 124. In one embodiment, the support arm 124 may attach to an upper surface 105 of the main frame 104 and extend in a direction away from the base surface 103 of the main frame 104 (e.g., where the mount plates 106 are attached). The support arm 124 may correspond to a hollow tube, or welded tube frame, that allows cables, wires, etc., to run from the head unit 130 to the controller enclosure 110. The head unit 130 may attach to the support arm 124 via a flange 126. The flange 126 may fasten to the head unit 130 via one or more fasteners. These fasteners may be security fasteners, preventing removal or tampering of the components in the head unit 130.

The head unit 130 is shown as a substantially cylindrical shape extending from the flange 126 to the cover plate 132. The head unit 130 may correspond to a hollow tube made from metal, plastic, composites, combinations thereof, and/or the like. In any event, the head unit 130 may include a hollow space, or interior volume, that is configured to receive and mount the components of the head unit 130. The cover plate 132 may attach to the head unit 130 via a screw interface, fastener interface, and/or some other mechanical interconnection.

The head unit 130 includes the forward image sensor 134, downward image sensor 138, indicator 142, and audio output device 146. The forward image sensor 134 is arranged to view a user (e.g., person checking out at the self-checkout system 100) and the downward image sensor 138 is arranged to view a tray 166 placed, for example, in the tray viewing window 150 (see, e.g., FIG. 1B).

As illustrated in FIG. 1B, the forward image sensor 134 may correspond to a camera (e.g., photo and/or video camera, etc.) that has a first field of view 194 capable of capturing an image of the face of a user checking out at the self-checkout system 100. The first field of view 194 includes a lower height limit, H1, and an upper height limit, H2, measured from the floor 180. The first field of view 194 of the forward image sensor 134 may allow users of various heights to be detected and identified when they are standing in front of the self-checkout system 100 (e.g., between the left-hand side 160A and right-hand side 160B of the self-checkout system 100). For example, a first user 164A having a first height (e.g., from the floor 180 to the top of the head of the first user 164A) may be standing in front of the self-checkout system 100 with a tray 166 arranged in the tray viewing window 150. The tray 166 may be arranged on a tray support 170 (e.g., rails, etc.) of a meal line. The first user 164A may represent a shortest user of the self-checkout system 100. Continuing this example, a second user 164B having a second height that is taller than the first height may be standing in front of the self-checkout system 100 with a tray 166 arranged in the tray viewing window 150. The second user 164B may represent a tallest user of the self-checkout system 100. In any event, the first field of view 194 of the forward image sensor 134 is capable of identifying users of any height, including users in wheelchairs. In one embodiment, the forward image sensor 134 may include a wide-angle or ultra wide-angle lens (e.g., fisheye lens, etc.) that provides a greater first field of view 194 for the forward image sensor 134 than when using a rectilinear lens.

The downward image sensor 138 may correspond to a camera (e.g., photo and/or video camera, etc.) that has a second field of view 198, as shown in FIG. 1B, that is capable of capturing an image of a tray 166 that is arranged in the tray viewing window 150 of the self-checkout system 100. The second field of view 198 is arranged to encompass a tray viewing window 150 that is disposed below the lower height limit, H1, of the forward image sensor 134. The second field of view 198 of the downward image sensor 138 may allow a tray 166 to be arranged in different positions within the tray viewing window 150, for example, without requiring the tray to be clamped and/or precisely aligned to the downward image sensor 138. Among other things, this allows users to position the tray 166 in the tray viewing window 150 with slight variations in X-axis and Y-axis position and still ensure positive identification of the meal on the tray 166.

The angles shown between the upper and lower limits of each of the fields of view 194, 198 are provided for illustrative purposes only and embodiments of the present disclosure are not limited to the schematic angles represented in FIG. 1B. For instance, the angle between the lower height limit, H1, and the upper height limit, H2, of the forward image sensor 134 may be greater than 90 degrees (e.g., 100, 110, 120, etc.). As can be appreciated, angles shown in FIG. 1B are intended to schematically represent that the image sensors 134, 138 have a range greater than a single line or width of rectilinear view.

The head unit 130 may include one or more user interface devices that are configured to provide information and/or indications to a user, or a monitor, of the self-checkout system 100. For instance, the head unit 130 may include an indicator 142 and an audio output device 146. The indicator 142 may correspond to a light or light emitting diode (LED). In one example, the LED may be configured, depending on a state of the self-checkout system 100, to display one or more colors indicative of the state. For instance, the LED may display a green color to indicate a successful operation of the self-checkout system 100, a red color to indicate an unsuccessful operation of the self-checkout system 100, and/or a yellow color to indicate a warning associated with the self-checkout system 100. In some embodiments, the indicator 142 may blink, provide animations, or otherwise selectively illuminate/darken based on a state of the self-checkout system 100.

The head unit 130 includes an audio output device 146 that is capable of outputting sound based on a state of the self-checkout system 100. The audio output device 146 may correspond to a speaker or transducer that emits sound and provides audio information and/or audio indications to a user, or monitor, of the self-checkout system 100. For instance, the speaker may emit a positive "chime" sound to indicate a successful operation of the self-checkout system 100, a short low "buzz" sound to indicate an unsuccessful operation of the self-checkout system 100, and/or a "chirp" sound to indicate a warning associated with the self-checkout system 100. It should be understood that these sounds are for illustrative purposes only and other sounds may be emitted by the audio output device 146. In some embodiments, the audio output device 146 may selectively provide simulated speech, text, conversational audio output, or other spoken outputs based on a state of the self-checkout system 100. In some embodiments, the audible indications provided by the audio output device 146 may be similar to the indications provided by the indicator 142, although in audio format. Among other things, the audio output device 146 may be configured to provide audio indications for users who may be visually impaired, while the indicator 142 may be configured to provide visible indications for users who may be hearing impaired. In some embodiments, the indications provided by the indicator 142 and the audio output device 146 may provide a rich user experience for those users engaging with the self-checkout system 100. In one embodiment, the audible output provided by the audio output device 146 may be in the form of a character (e.g., a friendly robot, video game, or cartoon character, etc.) to provide a friendly welcoming interface for users.

Although described as discrete devices, the indicator 142 and audio output device 146 may be part of a consolidated user interface device such as a consolidated audio/video display device. In some embodiments, the user interface devices of the head unit 130 may include a display device that is capable of rendering images, text, characters, animations, and/or the like.

Figure 2:
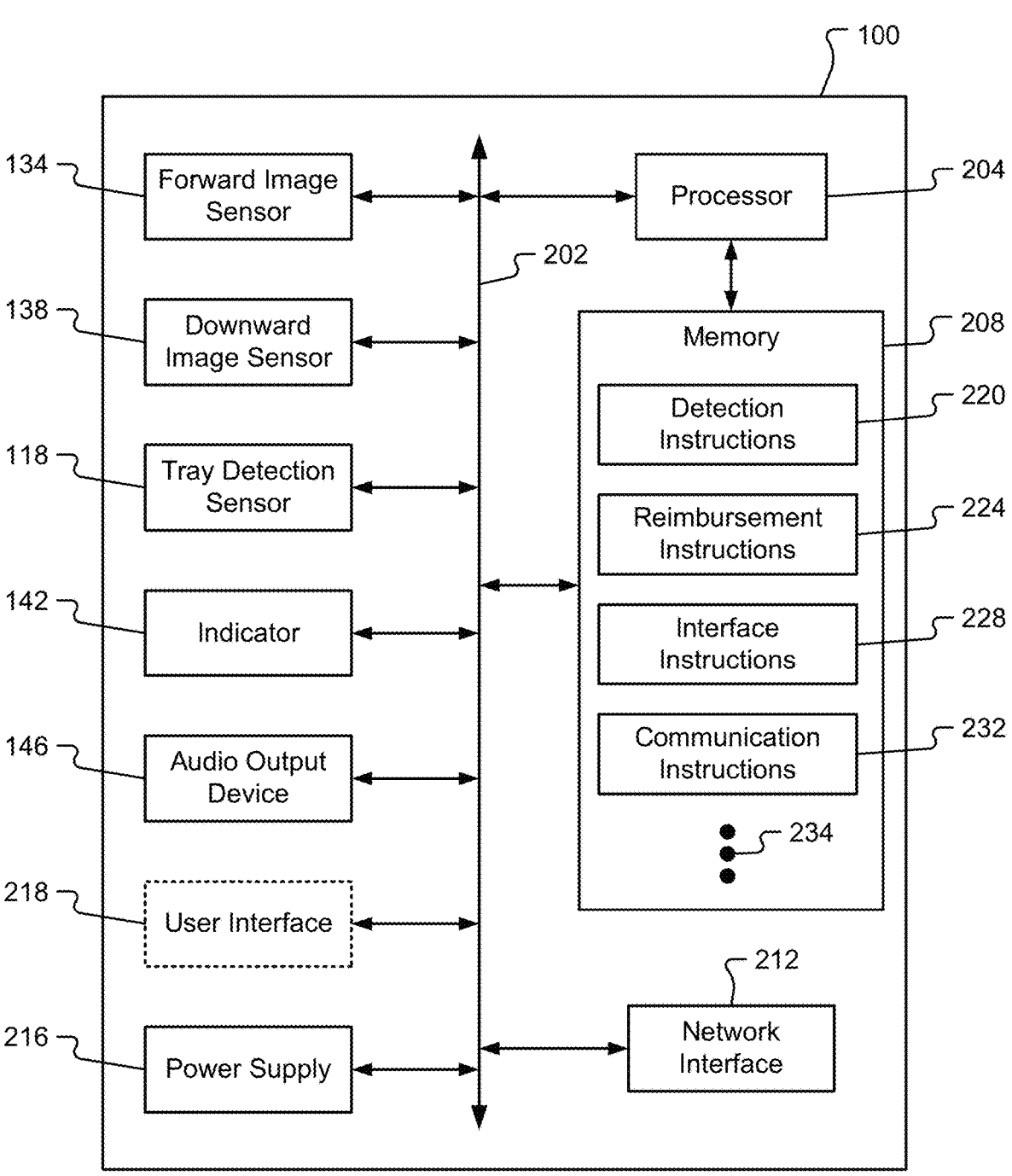
FIG. 2 is a block diagram depicting components of a self-checkout system for identifying and processing a meal in accordance with embodiments of the present disclosure.

FIG. 2 is a block diagram depicting components of the self-checkout system 100 for identifying and processing a meal in accordance with embodiments of the present disclosure. The block diagram of FIG. 2 may correspond to one or more of the components shown in FIGS. 1A and 1B. The components of the self-checkout system 100, while depicted as having particular instruction sets and devices, are not necessarily limited to the examples depicted herein. Rather, a system according to embodiments of the present disclosure may include one, some, or all of the components depicted in the self-checkout system 100 and does not necessarily have to include all of the components in a single device. For instance, the components of the memory 208 may be distributed amongst a plurality of servers and/or other devices (e.g., other self-checkout systems 100, servers, ESC, mobile devices, etc.) in the school food and beverage recognition and processing system without departing from the scope of the present disclosure.

The components of the self-checkout system 100 may communicate with one another and/or receive power over a bus 202. The bus 202 may correspond to a power and/or communications bus. For instance, communications between various components of the self-checkout system 100 may be carried by one or more buses 202. In some embodiments, power may be supplied to the components of the bus 202 from a power supply 216. The power supply 216 may include, but is in no way limited to, a battery, an AC-to-DC converter, power control logic, and/or ports for interconnecting components of the self-checkout system 100.

The self-checkout system 100 is shown to include a processor 204, memory 208, and a network interface 212. These resources may enable functionality of the self-checkout system 100 as will be described herein. In some embodiments, the processor 204 may correspond to one or many microprocessors, Central Processing Units ("CPUs"), microcontrollers, Integrated Circuit ("IC") chips, or the like. The processor 204 may be configured to execute one or more instruction sets stored in memory 208. In some embodiments, the instruction sets stored in memory 208, when executed by the processor 204, may enable the self-checkout system 100 to provide meal identification and processing functionality. The processor 204 and/or the memory 208 may be referred to herein as a controller.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 204 may be a multipurpose, programmable device that accepts digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system.

The network interface 212 may include, without limitation, an Ethernet port, a Universal Serial Bus (USB) port, an RS-232 port, an RJ-45 port, a network interface controller ("NIC"), an antenna, a driver circuit, a modulator/demodulator, etc. The network interface 212 may include one or multiple different network interfaces depending upon whether the self-checkout system 100 is connecting to a single communication network or multiple different types of communication networks. For instance, the self-checkout system 100 may be provided with both a wired network interface 212 and a wireless network interface 212 without departing from the scope of the present disclosure. Among other things, the network interface 212 provides the self-checkout system 100 with the ability to send and receive communication packets or the like over a communication network. In one embodiment, rails connect to the processor 204/controller through an RS-232 serial cable. The serial cable carries the various sensor wires of the self-checkout system 100 to the processor 204/controller. In one embodiment, each of the image sensors 134, 138 may be connected via USB and, as such, two USB cables can be run as a bundle through the support arm 124 to the controller enclosure 110 to the processor 204/controller. In one embodiment, a serial cable may be interconnected to the sensor 118 and run through the left enclosure 112A, the main frame 104, and controller enclosure 110 to the processor 204/controller. Alternatively, the processor 204/controller may be connected directly with the sensor wires.

As provided above, the power supply 216 may correspond to a battery, battery backup, and/or interconnection to an external power source. In some embodiments, the power supply 216 may include one or more components that are capable of converting alternating current ("AC") power into direct current ("DC") power for the self-checkout system 100. The power supply 216 may include a plug for direct connection into a standard power receptacle. In some embodiments, the power supply 216 may include a battery that is capable of supplying power to the self-checkout system 100 in the event of power failure.

The self-checkout system 100 may optionally include a user interface 218. The user interface 218 may provide one or more outputs as previously described in conjunction with the indicator 142 and audio output device 146. The user interface 218 may include a display screen, speakers, or any other component that is capable of enabling user interaction with the self-checkout system 100. The user interface 218 may also include one or more drivers for the various hardware components that enable user interaction with the self-checkout system 100.

The sensor 118, forward image sensor 134, downward image sensor 138, indicator 142, and audio output device 146 have been described in conjunction with FIGS. 1A and 1B above and, as such, additional description in conjunction with FIG. 2 has been omitted for brevity and clarity in disclosure.

The memory 208 may include one or multiple computer memory devices that are volatile or non-volatile. The memory 208 may be configured to store instruction sets that enable user interactions with the self-checkout system 100 and that enable meal identification and processing at the self-checkout system 100. Examples of instruction sets that may be stored in the memory 208 include a detection instruction set 220, a reimbursement instruction set 224, an interface instruction set 228, and a communication instruction set 232. In addition to the instruction sets shown, the memory 208 may also be configured to store one or more 234 instruction sets 234 that provide other functionality of the self-checkout system 100 and/or the school food and beverage recognition and processing system, as described herein.

In some embodiments, the detection instruction set 220, when executed by the processor 204, may enable the self-checkout system 100 to detect the presence of a tray 166, user, and/or other item in the first field of view 194, the second field of view 198, and/or the sensing area of the sensor 118. In one embodiment, the detection instruction set 220 may include instructions that, when an object (e.g., tray 166) is within the sensing area of the sensor 118, causes the self-checkout system 100 to initiate a meal identification and processing method. In response, the forward image sensor 134 may be instructed to capture an image of a user in front of the self-checkout system 100 and the downward image sensor 138 may be instructed to capture an image of a tray 166 in the tray viewing window 150. In some embodiments, the forward image sensor 134 and the downward image sensor 138 may be configured to simultaneously capture image information and store the captured image information in the memory 208. Although described as an image, in some embodiments, multiple images may be captured per second (e.g., 5-10 or more, etc.). The detection instruction set 220 may include instructions that cause the processor 204 to retrieve identification information or data from one or more websites, servers, etc., that are used to enable detection and identification by the self-checkout system 100. In one example, this data may include menu identification information (e.g., set menus, food data, etc.), qualification information (e.g., combinations of food items that are reimbursable, or not, etc.), and/or the like. In some examples, the data may include information about users of the self-checkout system 100 such as, but in no way limited to, identity information, allergy information, personal information (e.g., birthday, age, etc.), student identification, and/or the like. In some embodiments, data or information obtained by the detection instruction set 220 may be used by the interface instruction set 228 in providing one or more indications from the self-checkout system 100 (e.g., via the indicator 142, audio output device 146, etc.).

In some embodiments, the reimbursement instruction set 224, when executed by the processor 204, may enable the self-checkout system 100 to determine whether a meal on the tray 166 qualifies for reimbursement (e.g., as defined by the NSLP and USDA). In some embodiments, the reimbursement instruction set 224 may include subroutines that obtain menu information, reimbursement information, and/or other information used in determining whether, based on images captured of a meal on a tray 166 (e.g., by the downward image sensor 138), a meal is reimbursable. In some embodiments, data or information obtained by the reimbursement instruction set 224 may be used by the interface instruction set 228 in providing one or more indications from the self-checkout system 100 (e.g., via the indicator 142, audio output device 146, etc.).

In some embodiments, the interface instruction set 228, when executed by the processor 204, may enable the self-checkout system 100 to provide one or more indications via the indicator 142 and/or the audio output device 146. For example, the interface instruction set 228 may, based on information obtained by execution of the detection instruction set 220 and/or the reimbursement instruction set 224, cause a visual or audible output indication to be provided for a specific user when an allergy is determined, it is the user's birthday, or an item on the tray 166 is not permitted for an identified user. Additionally or alternatively, the interface instruction set 228 may cause outputs to be provided (e.g., via the indicator 142 and/or the audio output device 146, etc.), based on a state of the self-checkout system 100.

In some embodiments, the communication instruction set 232, when executed by the processor 204, may enable the self-checkout system 100 to send and/or receive data across a communication network (e.g., via the network interface 212). These communications may include sending captured images from the forward image sensor 134 and/or the downward image sensor 138 to one or more databases and/or servers (e.g., the ESC, etc.) across a wired and/or wireless communication network. The communication instruction set 232, when executed by the processor 204, may receive information about reimbursable meals, user identification, special messages (e.g., birthday messages for a user, allergy messages for a user, etc.), and/or the like.

Any of the components of the self-checkout system 100 described above may work in conjunction with the instruction sets 220, 224, 228, 232 stored in the memory 208.

Figure 3:
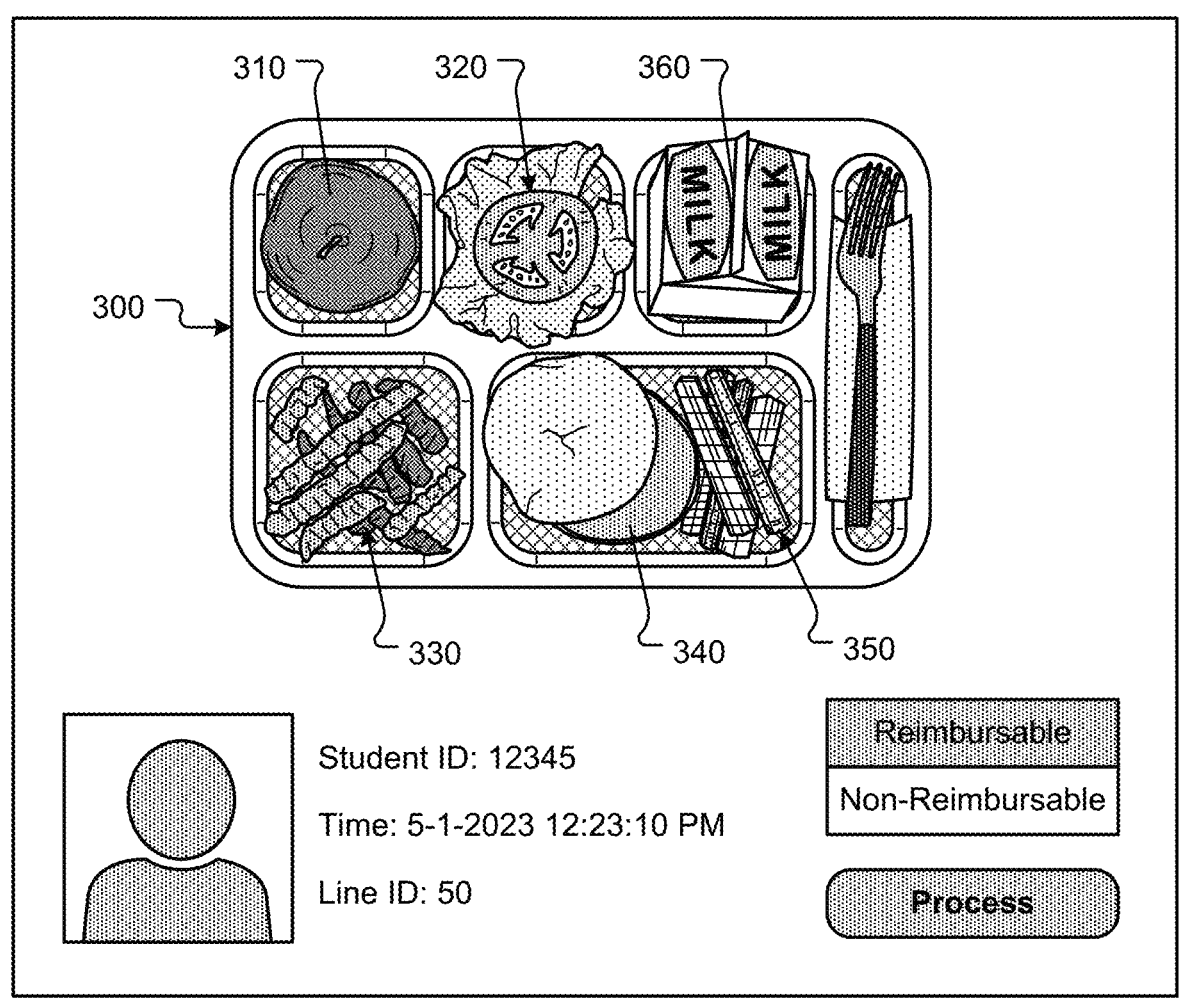
FIG. 3 shows a first schematic diagram of a user interface window of a server system of a school food and beverage recognition and processing system based on data received from the self-checkout system in accordance with embodiments of the present disclosure.

Referring to FIG. 3, a first schematic diagram of a user interface window of a server system of a school food and beverage recognition and processing system is shown. The interface may be generated based on data received from the self-checkout system 100. In one embodiment, the user interface window shown in FIG. 3 may correspond to an ESC user interface for a simple version of the system (e.g., a version of the self-checkout system 100 that merely determines if the tray 300 includes a meal that is reimbursable or non-reimbursable). The tray 300 shown in FIG. 3 may correspond to the tray 166 described above. As illustrated in FIG. 3, the ESC user interface shows whether the tray 300 contains all of the items required by the NSLP to qualify as a reimbursable meal, or not. In this embodiment, the camera (e.g., the forward image sensor 134) takes a photo of the tray 300 and the photo is sent to the processor 204/controller and then either processed by the processor 204/controller or is sent from the processor 204/controller to another processing location (e.g., processed in the cloud) to determine what is on the tray 300 and whether the tray 300 contains all of the components required to qualify as a meal (e.g., reimbursable meal, etc.). In some embodiments, this version of the system 100 may merely determine whether a meal (e.g., a plurality of food) is present or if a single item (e.g., fruit, vegetable, etc.) is present to determine if the meal is a reimbursable meal, for example at certain elementary schools where students' options are limited.

Figure 4:
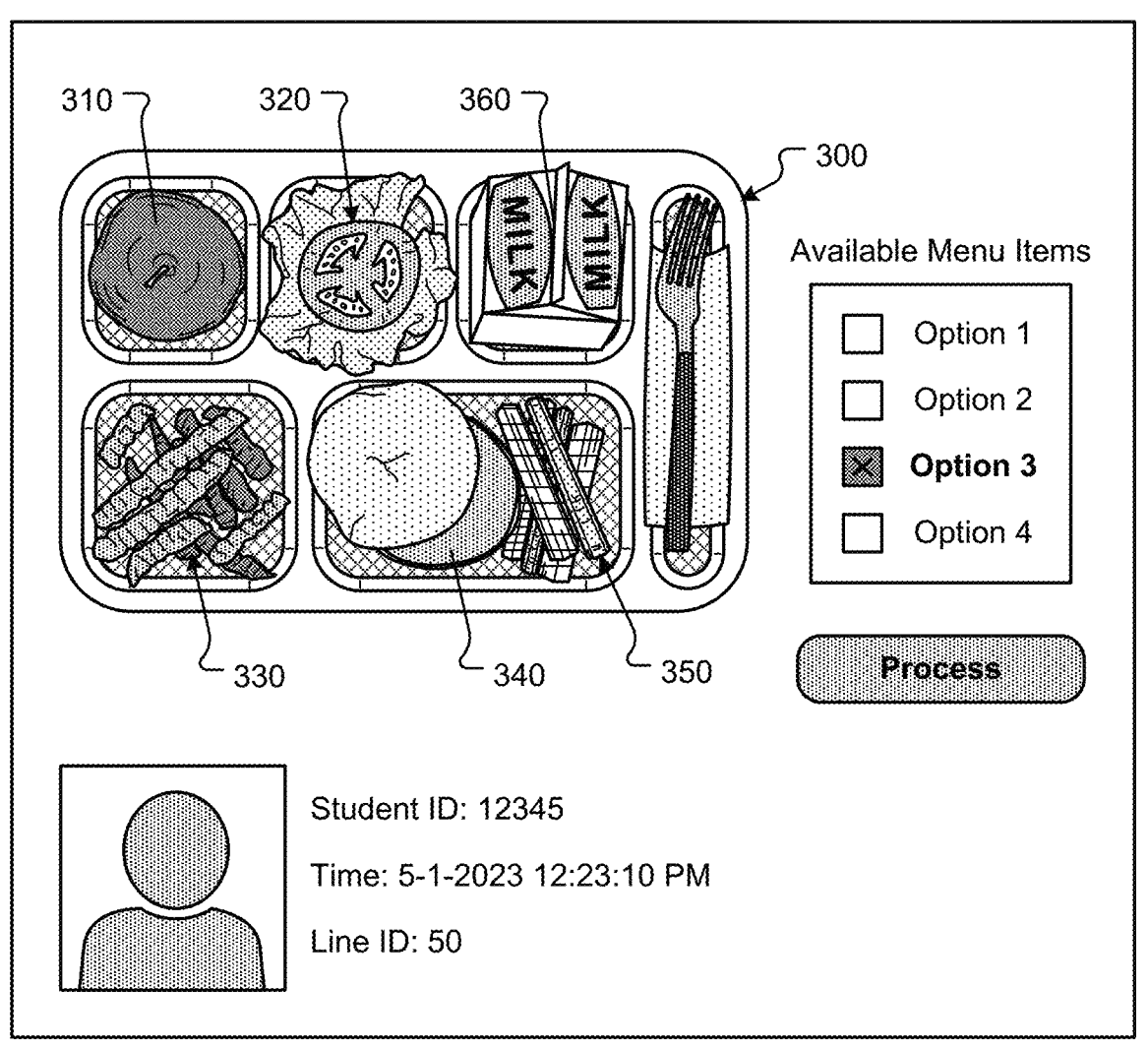
FIG. 4 shows a second schematic diagram of a user interface window of a server system of a school food and beverage recognition and processing system based on data received from the self-checkout system in accordance with embodiments of the present disclosure.

FIG. 4 shows a second schematic diagram of a user interface window of a server system of a school food and beverage recognition and processing system based on data received from the self-checkout system 100 in accordance with embodiments of the present disclosure. In one embodiment, the user interface window shown in FIG. 4 may correspond to an ESC user interface for the meal item identification version of the system (e.g., a version of the self-checkout system 100 that determines if the tray 300 has a meal that is reimbursable or non-reimbursable and tracks (e.g., records and stores, etc.) the specific items on the user's tray 300). For example, the self-checkout system 100 can either (A) note that the user's tray 300 has an apple 310, lettuce and tomato 320, fries 330, a hamburger 340 (e.g., a veggie burger, etc.), carrots and celery 350 (e.g., a vegetable), and milk 360 (e.g., white milk, skim milk, etc.); or (B) the self-checkout system 100 can determine that the tray 300 has meal "Option 3," which includes an apple 310, lettuce and tomato 320, fries 330, a hamburger 340, carrots and celery 350, and milk 360, based on inputs and settings input by the school for the specific day. Self-checkout systems 100 using option (B) may correspond to elementary schools where children are given two to five options, and where each option includes a complete tray with sides, vegetables, white milk, and/or other items required by the NSLP. Oftentimes, young students are unable to quickly fill a tray with food and young students (and older students) may not put a vegetable on their tray because they do not want to eat vegetables, but a vegetable may be required by the NSLP to qualify as a full meal. The system versions available based on the user interface shown in FIG. 4 allow the school to more accurately track the food consumed for ordering and inventory purposes.

For both the simple version and the meal item identification version described above, the school may input the daily menu into the self-checkout system 100 such that the system knows the various options available to customers that day. The school may input this data locally (e.g., via communication with the processor 204/controller) or remotely via a server input (e.g., that the self-checkout system 100 communicates with via the communication instruction set 232, etc.). Alternatively, daily menu information may be obtained from a third-party server (e.g., nutritional software) or other source. As can be appreciated, this preloaded input will reduce the processing power needed and improve the accuracy of the data processing and tracking by the self-checkout system 100. For example, if the system knows that macaroni and cheese is offered on a particular day and that French fries are not offered on that particular day, then the item on the user's tray that is identified to be yellowish orange in color can be determined to be macaroni and cheese. Additionally, if the system knows that a chicken sandwich is offered on a particular day, but a hamburger is not offered on that particular day, then the item that looks like a hamburger bun with something therein is classified as a chicken sandwich and not a hamburger. If such input is not included, then the system may require more processing power and possible human intervention to determine or verify the exact contents on a user's tray. By the specific school inputting the food options daily (e.g., locally or remotely), the self-checkout system 100 can more accurately determine if the tray 300 includes an entrée, one or more sides, and a beverage. Without such specific input, the system may confuse an entrée with a side and the meal may be marked as "non-reimbursable" when the meal is in fact reimbursable.

In various embodiments, the self-checkout system 100, specifically the processor 204/controller and components in the controller enclosure 110 attached to the self-checkout system 100, will push to the ESC periodically, and the self-checkout system 100 will push new data and move the new data to an archive folder on the self-checkout system 100 for temporary retention once the data has been pushed. The self-checkout system 100 processor 204/controller may include a "cleanup" routine that deletes files from the archive that are older than a predetermined time/age. Permitting the archived data to remain on the self-checkout system 100 processor 204/controller and/or other memory 208 in the controller enclosure 110 for a period of time provides additional durability against data loss.

In some embodiments, the ESC will store metadata in the processing queue in, for example, a structured query language ("SQL") database or other database. Data can be stored on a disk, on a back-up hard drive, on a local server, in the cloud, or using any other known storage technique. In some embodiments, data can be stored in folders named after the UUID, which may be globally unique across all users/customers. The metadata format can have a version number to indicate the format details. For example, the metadata format may include, but is in no way limited to, version identification, UUID, student account identification, timestamp, reimbursable decision (true/false), and/or other data.

In various embodiments, the data can either be communicated to the cloud to be processed by remote processors and on remote servers or be processed locally on the ESC. Data can be processed in either location with whichever method, as preferred by the specific school. For example, the data is synchronized (i.e., synced) from the self-checkout system 100 to the ESC box, which may be located at the school (e.g., on-site), but may also be in a different location from the self-checkout system 100 (e.g., not on-site, remotely located). The data on the ESC may further be sent to cloud storage. In embodiments, the data may be synced between the ESC and the cloud using Databridge encrypted bidirectional syncing technology. In embodiments, the data may be synced between the self-checkout system 100 and the cloud using a similar process. In some embodiments, the data can be processed locally and/or independently if the customer (e.g., a specific school or school district) decides not to use cloud synchronization for the data or decides not to use the cloud AI solution.

Databridge encrypted bidirectional syncing may be used as a technology for syncing school meal transactions and student information data. Embodiments of the self-checkout system 100 for tracking school meals disclosed herein may use Databridge for bidirectional synchronization of the processing queue up to the cloud, which allows for processing via either the ESC or the cloud environment. Moreover, third parties can also process the system's cloud queue with embodiments of the API disclosed herein. Accordingly, embodiments of the present disclosure provide a modular and delayed approach to school meal analyzation, tracking, processing, etc., which is a distinguisher and improvement from prior art AI school meal checkout solutions. In embodiments of the present disclosure, the processing can be done via AI software running in real time, AI software running at a later time, a human onsite, a human offsite, a human in real time, a human at a later time, a third party or third party software, or any combination thereof.

In various embodiments, the cloud user interface will be similar to the ESC user interface and will allow for processing of the data either using AI or manually when the processed data has a low confidence score. Additionally, in some embodiments, an application programming interface ("API") may allow third parties to consume the processing queue and mark entries themselves, for either third party AI processing or outsourcing meal identification to humans via services such as Amazon's Mechanical Turk, etc.

Figure 5:
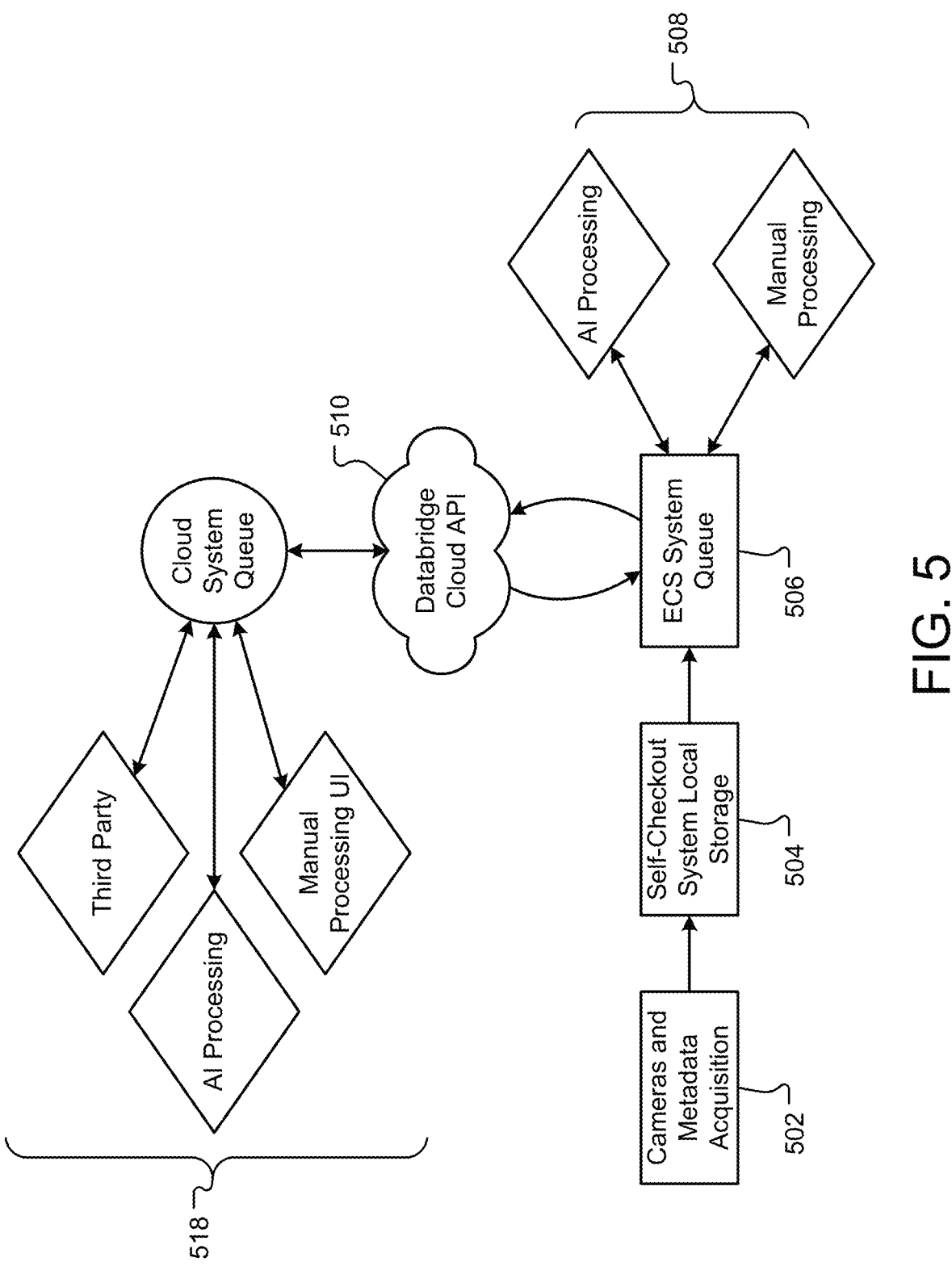
FIG. 5 shows a block diagram of a processing flow for the school food and beverage recognition and processing system in accordance with embodiments of the present disclosure.

FIG. 5 shows a block diagram of a processing flow for the school food and beverage recognition and processing system in accordance with embodiments of the present disclosure. In particular, FIG. 5 illustrates an example of a process flow that supports the novel self-checkout method in accordance with aspects of the present disclosure. In some examples, the process flow may implement aspects of the processor 204/controller described above.

In the following description of the process flow, the operations may be performed in a different order than the order shown, or the operations may be performed in different orders or at different times. Certain operations may also be left out of the process flow, or other operations may be added to the process flow.

In step 502, information is gathered. For example, image data (e.g., image of a student's tray) is stored with associated student information. In embodiments, an image of the student (e.g., user) is captured along with an image of the student's tray 166, 300. Additionally or alternatively, the student may scan/swipe their student identification card, and the student's information may be stored with the image information. Other metadata (e.g., menu data, time of day, line information, etc.) may be stored with each record. This information may be stored locally in the self-checkout system 100 (step 504). In step 506, the self-checkout system 100 transfers the information to the ESC system. For example, an API connects customer systems with the ESC to transfer the information. In embodiments, the information may be transferred in batches based on a predetermined schedule. In other embodiments, the information is transferred when there is a connection between the self-checkout system 100 and the ESC. Delaying processing and duplicating the information in multiple places increases reliability of the system, in case of internet outages or a failure of an individual self-checkout system 100 or ESC system.

In step 508, the information is processed using AI. For example, the images are processed to determine whether the lunch (e.g., captured and recorded by the self-checkout system 100) qualifies for reimbursement. Additionally, or alternatively, the images may be processed to determine what amount to charge each student (e.g., generate a total for all items in the image). For example, if an image includes an apple ($1.00), a drink ($1.50), and a sandwich ($3.00), the total charge would be $5.50. The processed information may also be used to train/improve the AI model used to process the information. The system may also transfer information/output (e.g., reimbursable yes/no or total charge) to relevant parties (e.g., administrators of school lunch programs). In embodiments, the present disclosure may output data regarding charges that the school may process and/or the system disclosed herein may handle payment processing once a total charge is determined. In embodiments, the information (e.g., images of food, student information, etc.) may be transferred in step 510 via a data bridge to a cloud system. The cloud system may queue the information for processing in step 518. In embodiments, a model is trained using machine learning to process the information. In some embodiments, if a confidence score associated with an image is below a threshold, the image may be flagged for manual review. In at least one embodiment of the present disclosure, the method and system may receive menu data. The menu data may be associated with a batch of images (e.g., all images from a specific time of day at a specific location, etc.). By processing the menu data, the system is able to selectively filter what menu items are possible, enhancing AI object recognition reliability. For example, if the menu consists of a sandwich, toppings, an apple, fries, and a milk (as shown in FIGS. 3 and 4), the AI processing can take a subset of its image library to run the comparisons. Having menu data also helps with image recognition accuracy. For example, some foods may have a similar appearance (e.g., persimmons and tomatoes), which may result in misidentified images, however, with menu data, the similar looking foods may be omitted, preventing misidentification. As stated above, the AI processing may be done either on the ESC box (which may be local or remote) or in the cloud environment. Therefore, schools can choose to keep data, rather than offload the data to the cloud, and do the AI processing on site on the ESC box or controller. This may be done for additional security or in instances where the school has low bandwidth, etc.

Figure 6A:
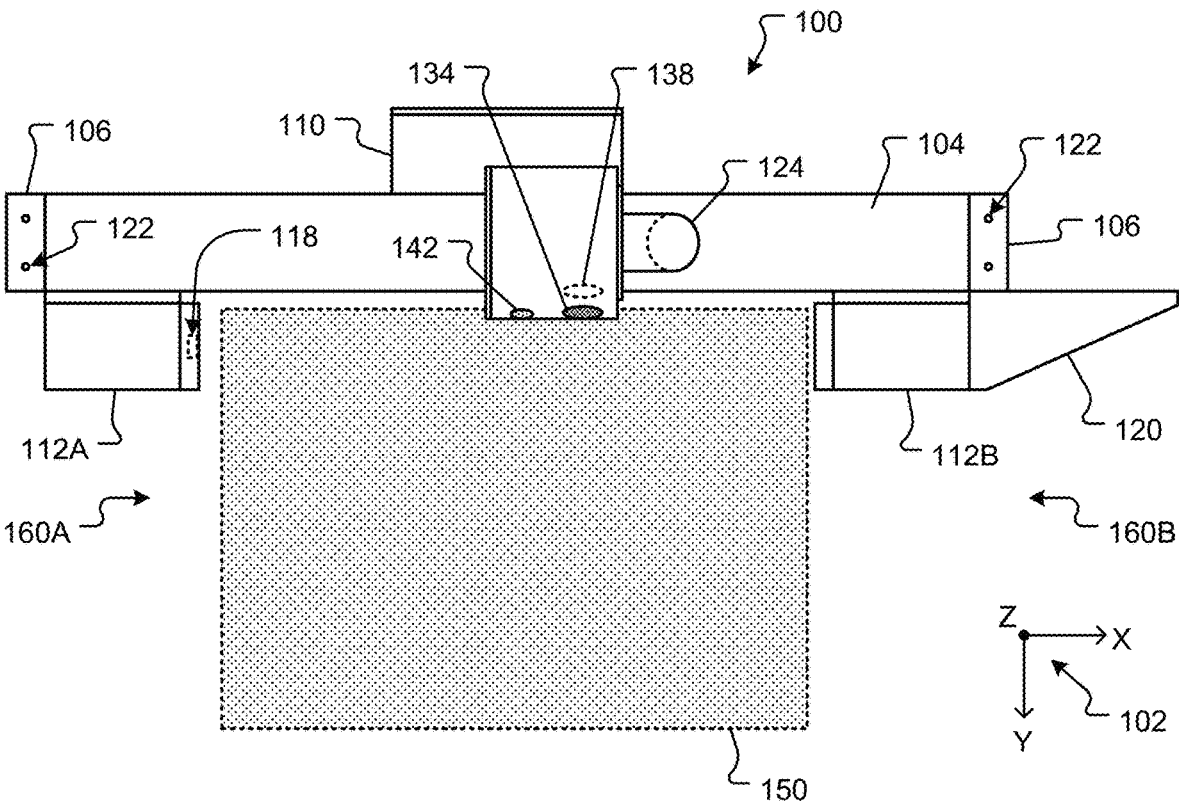
FIG. 6A shows a top plan view of a self-checkout system in a first state including a tray viewing window for receiving a meal for identification in accordance with embodiments of the present disclosure.
Figure 6B:
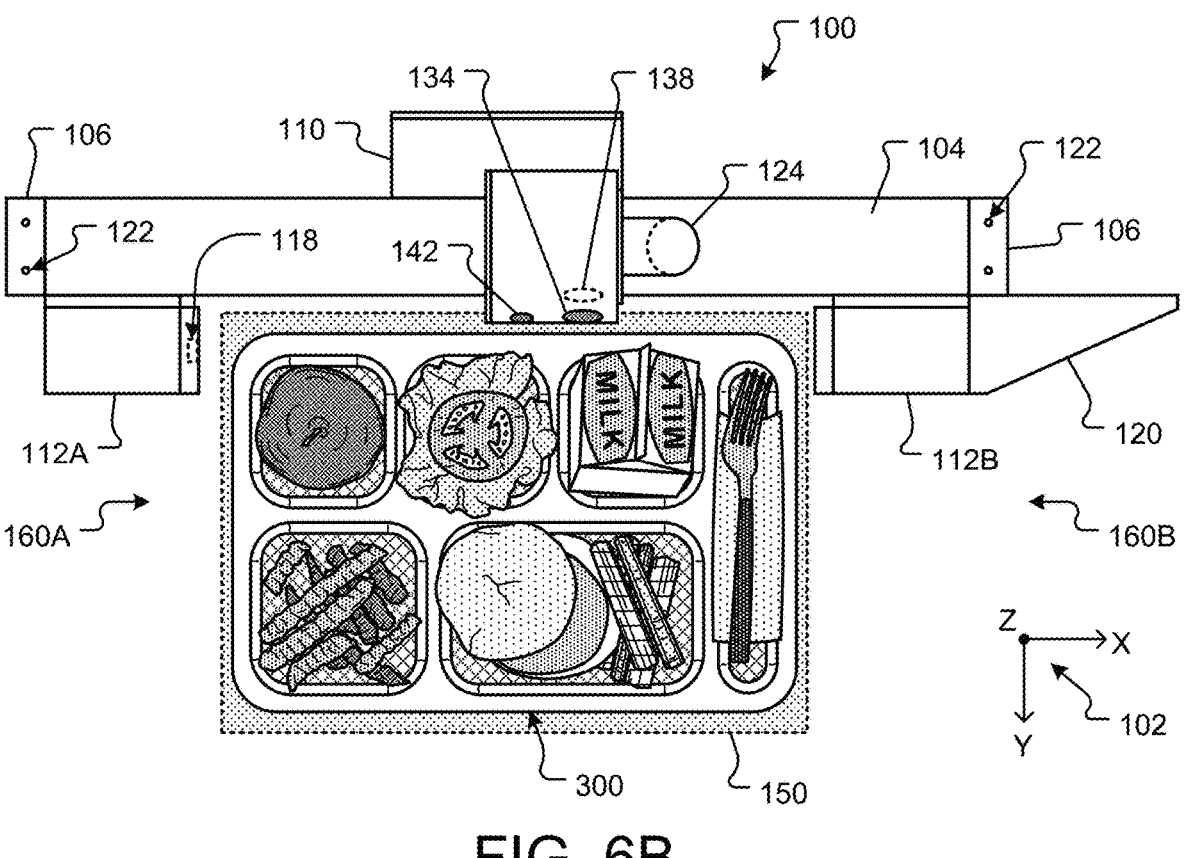
FIG. 6B shows a top plan view of a self-checkout system in a second state including a meal arranged in a tray viewing window in accordance with embodiments of the present disclosure.
Figure 6C:
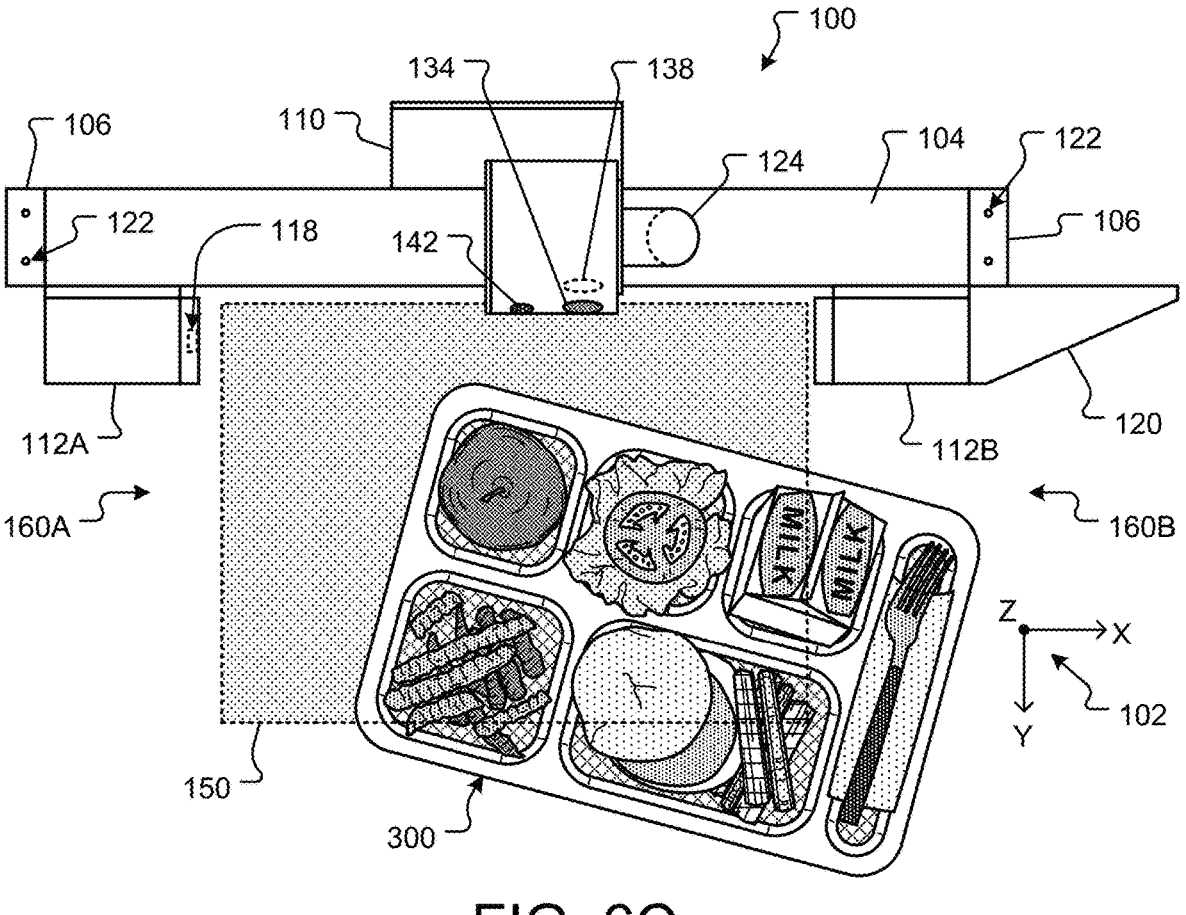
FIG. 6C shows a top plan view of a self-checkout system in a third state including a meal arranged partially in a tray viewing window in accordance with embodiments of the present disclosure.

FIGS. 6A-6C show a top plan view of the self-checkout system 100 in various states according to embodiments of the present disclosure.

In FIG. 6A, the self-checkout system 100 is shown with no object or tray in the tray viewing window 150. In this first state, the self-checkout system 100 is ready to receive a tray in the tray viewing window 150 for identification and processing. In some embodiments, the indicator 142 may illuminate with a specific color and/or animation to indicate that the self-checkout system 100 is in a "ready" state. Additionally or alternatively, the audio output device 146 may emit an audible output indicating that the self-checkout system 100 is in the "ready" state.

FIG. 6B shows a top plan view of a self-checkout system in a second state including a meal on a tray 300 arranged in the tray viewing window 150 in accordance with embodiments of the present disclosure. In this second state, the self-checkout system 100 has detected the tray 300 (e.g., via the sensor 118, etc.) and can take an image of the tray 300. Stated another way, the tray 300 is positioned accurately in the tray viewing window 150 and the self-checkout system 100 is in an operative identification and processing state. In some embodiments, the indicator 142 may illuminate with a specific color and/or animation to indicate that the self-checkout system 100 is in an "operable" state. Additionally or alternatively, the audio output device 146 may emit an audible output indicating that the self-checkout system 100 is in the "operable" state. When the tray 300 is in this position, the self-checkout system 100 may take images of the meal contents via the downward image sensor 138 and take images of the user (e.g., student) via the forward image sensor 134. These images are used to identify and process a meal as part of the school food and beverage recognition and processing system described herein.

FIG. 6C shows a top plan view of the self-checkout system 100 in a third state including a meal on a tray 300 arranged partially in the tray viewing window 150 in accordance with embodiments of the present disclosure. In this third state, the self-checkout system 100 has detected the tray 300 (e.g., via the sensor 118, etc.) but, based on images captured by the downward image sensor 138, the processor 204/controller may determine that the tray 300 needs to be repositioned to take an adequate image of the meal on the tray 300. Stated another way, the tray 300 is improperly positioned partially in the tray viewing window 150 and the self-checkout system 100 is incapable of taking a suitable image of the tray 300 such that the self-checkout system 100 is in an inoperative identification and processing state. In some embodiments, the indicator 142 may illuminate with a specific color and/or animation to indicate that the self-checkout system 100 is in an "inoperable" state. Additionally or alternatively, the audio output device 146 may emit an audible output indicating that the self-checkout system 100 is in the "inoperable" state. When the tray 300 is in the position shown in FIG. 6C, the self-checkout system 100 may request or indicate to the user that further action is required before images of the tray 300 can be taken and processed. Such indications may be provided visually and/or audibly (e.g., via the indicator 142 and/or the audio output device 146). In some embodiments, the indications may be provided audibly with a conversational message such as "please position the tray in the viewing area," or the like.

Figure 7A:
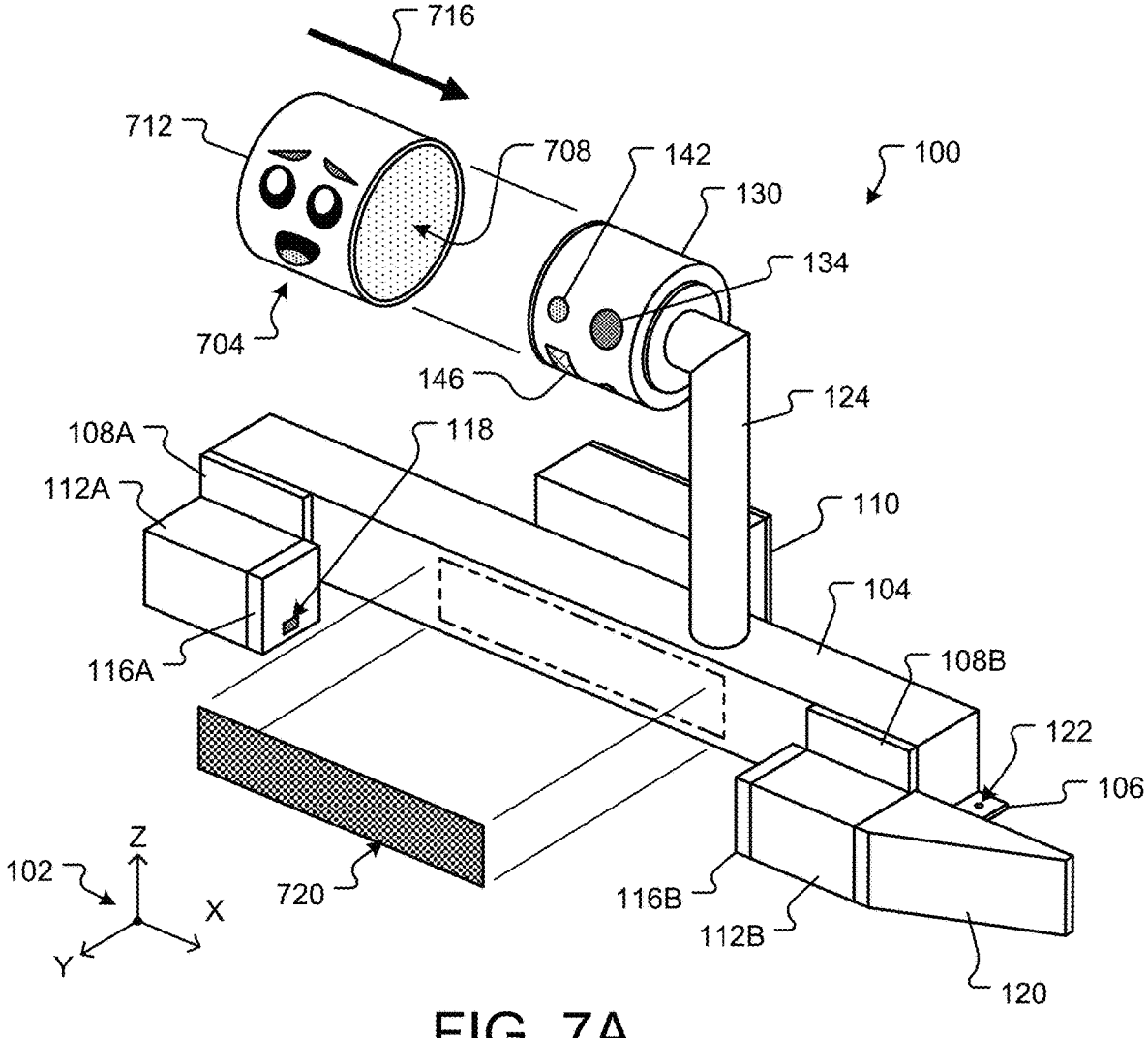
FIG. 7A shows a partially exploded schematic perspective view of the self-checkout system for identifying and processing a meal including a head cover and indicia artwork for application to the self-checkout system in accordance with embodiments of the present disclosure.
Figure 7B:
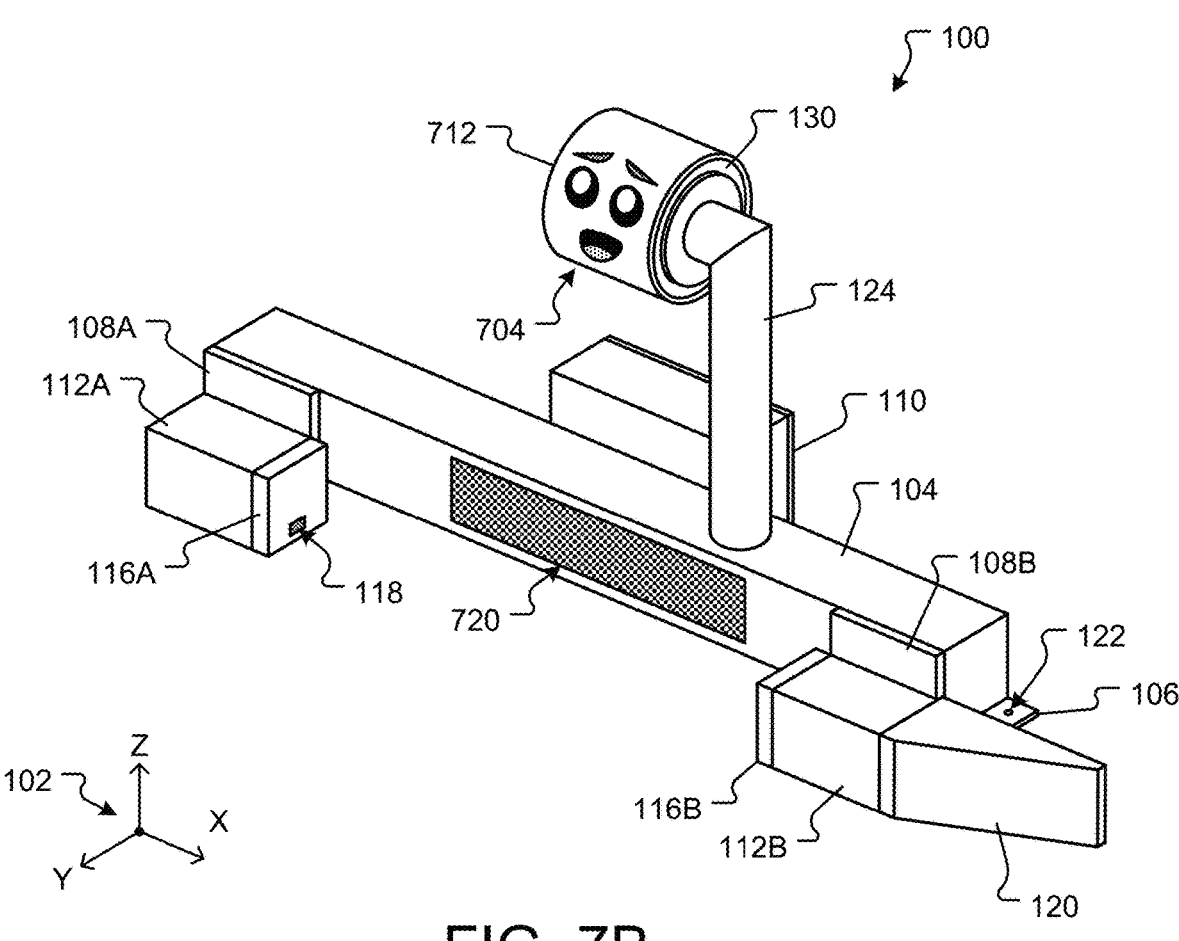
FIG. 7B shows a schematic perspective view of the self-checkout system of FIG. 7A with the head cover and indicia artwork applied to the self-checkout system in accordance with embodiments of the present disclosure.

Referring now to FIGS. 7A and 7B, a head cover 704 for the head unit 130 and other indicia 720 of a self-checkout system 100 are shown and described in conjunction with embodiments of the present disclosure. The head cover 704 and/or the front indicia 720 may be used alone or together in application to the self-checkout system 100.

As illustrated in the partially exploded schematic perspective view of the self-checkout system 100 of FIG. 7A, a head cover 704 may be applied to the head unit 130 by sliding the head cover 704 over an outer surface of the head unit 130 (e.g., moving the head cover 704 in a slide direction 716). The head cover 704 may be made from a decal or other formed material "sock" that covers one or more outer surfaces of the head unit 130. In some embodiments, the head cover 704 may be made from a padded material. For instance, the head cover 704 may be formed as a neoprene, flexible rubber, or silicone cup having an open end exposing a hollow interior 708 and an at least partially closed end forming an end face 712 of the head cover 704. In some embodiments, the head cover 704 may be stretched to form over the head unit 130. In this arrangement, the head cover 704 may clamp onto the head unit 130 under the elasticity of the material being maintained in a stretched state on the head unit 130. Additionally or alternatively, the head cover 704 may be arranged as a decal that can be applied to the outer surface of the head unit 130. When formed as a decal, the head cover 704 may include an adhesive layer inside the hollow interior 708 of the head cover 704. In some embodiments, the head cover 704 may be padded or arranged having a wall thickness that provides a cushion between the head unit 130 and an exterior of the head cover 704, when applied. In any event, the head cover 704 may provide a protective layer for the sensitive components housed in, or attached to, the head unit 130.

The head cover 704 may include decorative artwork on an outer surface thereof. For instance, and as illustrated in FIGS. 7A and 7B, the decorative artwork may resemble a friendly face or character (e.g., having eyes and a smile, etc.). Among other things, this decorative artwork may appeal to students, children, monitors, and/or other users of the self-checkout system 100. For example, when arranged as a friendly face, the users may be more inclined to interact with the self-checkout system 100 and/or follow commands, instructions, or indications provided by the self-checkout system 100. When coupled with a "voice" output by the audio output device 146, the self-checkout system 100 may present a comfortable, friendly, and welcoming personality for meal identification and processing.

In some embodiments, one or more features of the decorative artwork of the head cover 704 may align with features or components of the head unit 130. For example, one of the "eyes" of the friendly face artwork shown in FIGS. 7A and 7B (e.g., the left-hand side eye) may align with the indicator 142 of the head unit 130. The head cover 704 may include a cutout, aperture, or at least partially transparent portion of material that allows light from the indicator 142 to pass through the head cover 704. In some embodiments, light from the indicator 142 may pass through the material of the head cover 704, even without an aperture or transparent portion. Continuing this example, the other one of the "eyes" of the friendly face artwork shown in FIGS. 7A and 7B (e.g., the right-hand side eye) may align with the forward image sensor 134 of the head unit 130. The head cover 704 may include a cutout, aperture, or at least partially transparent portion of material that allows the forward image sensor 134 to see through the head cover 704. Additionally or alternatively, the audio output device 146 may generally align with the "mouth" of friendly face artwork of the head cover 704. Regardless of the precise location of the audio output device 146, the sound output from the audio output device 146 may seem to a user to emanate from the "mouth" of the friendly face artwork of the head cover 704. In one embodiment, one or more holes, apertures, or openings may be arranged in the "mouth" portion of the friendly face artwork of the head cover 704. These openings may be aligned with the location of the audio output device 146 of the head unit 130. In some embodiments, audio output from the audio output device 146 may pass through the material of the head cover 704. FIG. 7B shows a schematic perspective view of the self-checkout system 100 with the head cover 704 applied to the head unit 130 of the self-checkout system 100.

Additionally or alternatively, the self-checkout system 100 may include one or more front indicia 720. The front indicia 720 may be arranged as a decal, artwork, etching, or other decoration that is applied to a front-facing surface of the main frame 104. In some embodiments, the front indicia 720 may include a ruler, guide, arrows, and/or text that indicates to a user where to align their tray to interact with the self-checkout system 100. In one embodiment, the front indicia 720 may be arranged as a decal having an adhesive surface that is applied to a front face of the main frame 104. The opposing surface of the decal may include at least one decoration (facing forward toward a user of the self-checkout system 100). The decoration may include a message like "hi, please align your tray between the marks to get started" that is disposed between two arrows, or other marks, arranged on each end of the front indicia 720 (e.g., between the left-hand side 160A and the right-hand side 160B of the self-checkout system 100). Additionally or alternatively, the front indicia 720 may include positive messages, advice, instructions, and/or some other artwork. In one example, the front indicia 720 may be used to display signs or images of school spirit. FIG. 7B shows a schematic perspective view of the self-checkout system 100 with the front indicia 720 applied to the main frame 104 of the self-checkout system 100.

Figure 8:
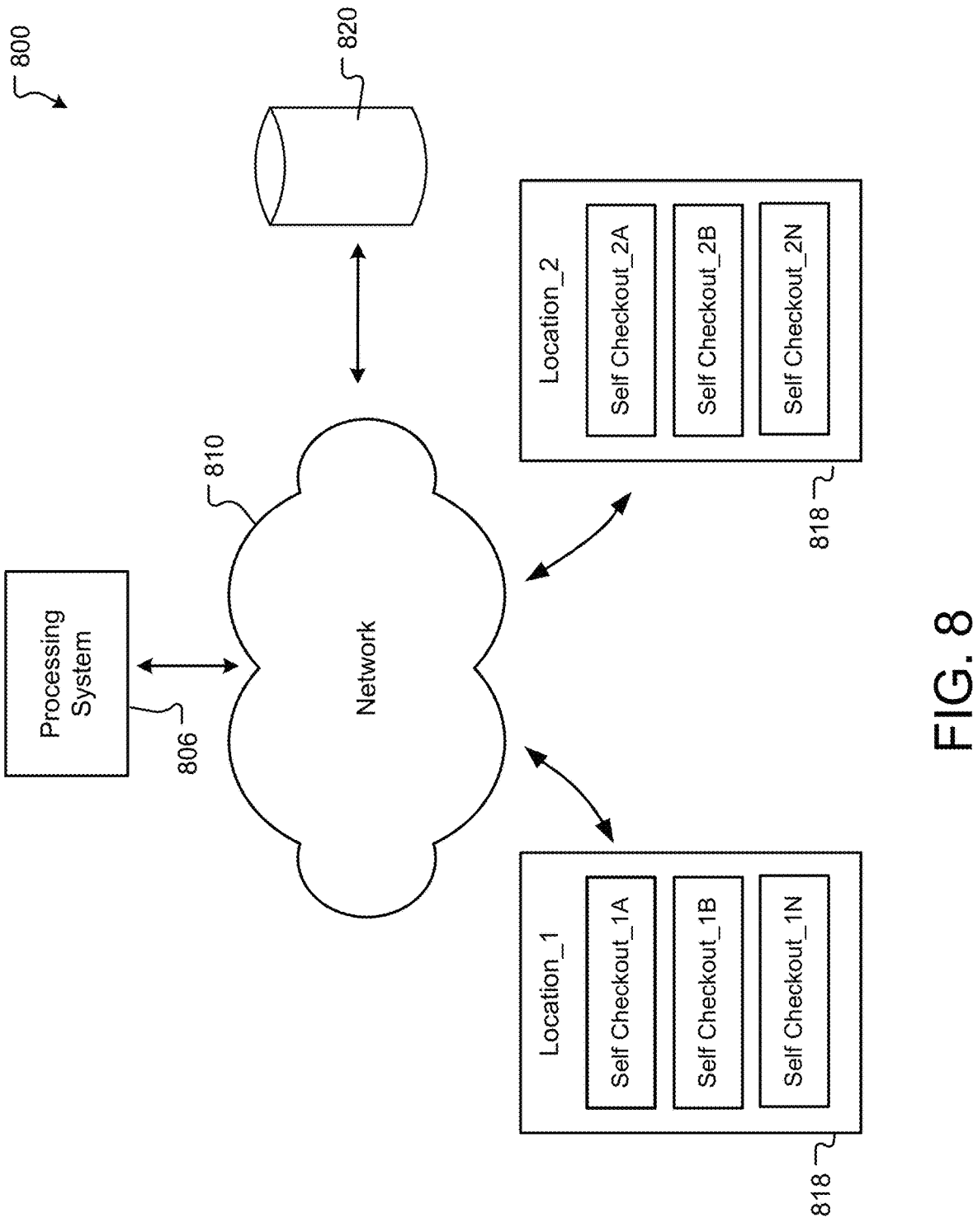
FIG. 8 is a block diagram of a school food and beverage recognition and processing system for identifying and processing a meal using the self-checkout system of the school food and beverage recognition and processing system in accordance with embodiments of the present disclosure.

FIG. 8 is a block diagram of a school food and beverage recognition and processing system 800 for identifying and processing a meal in accordance with embodiments of the present disclosure. The system 800 includes a processing system 806, a network 810, a database 820, and locations 818. Each location 818 includes one or more self-checkout systems (e.g., the self-checkout system 100) that communicate their information to the processing system 806 over the network 810. For example, each location may be a school. The database 820 may store menu information, customer information, etc. In embodiments, the processing system 806 may be directly connected to the database 820. In embodiments, the self-checkout system at each location 818 captures information (e.g., images) and transfers the information to the processing system 806 for determining the contents of each customer's tray. In embodiments, the processing system 806 and/or the database 820 may be local to each location 818.

Figure 9:
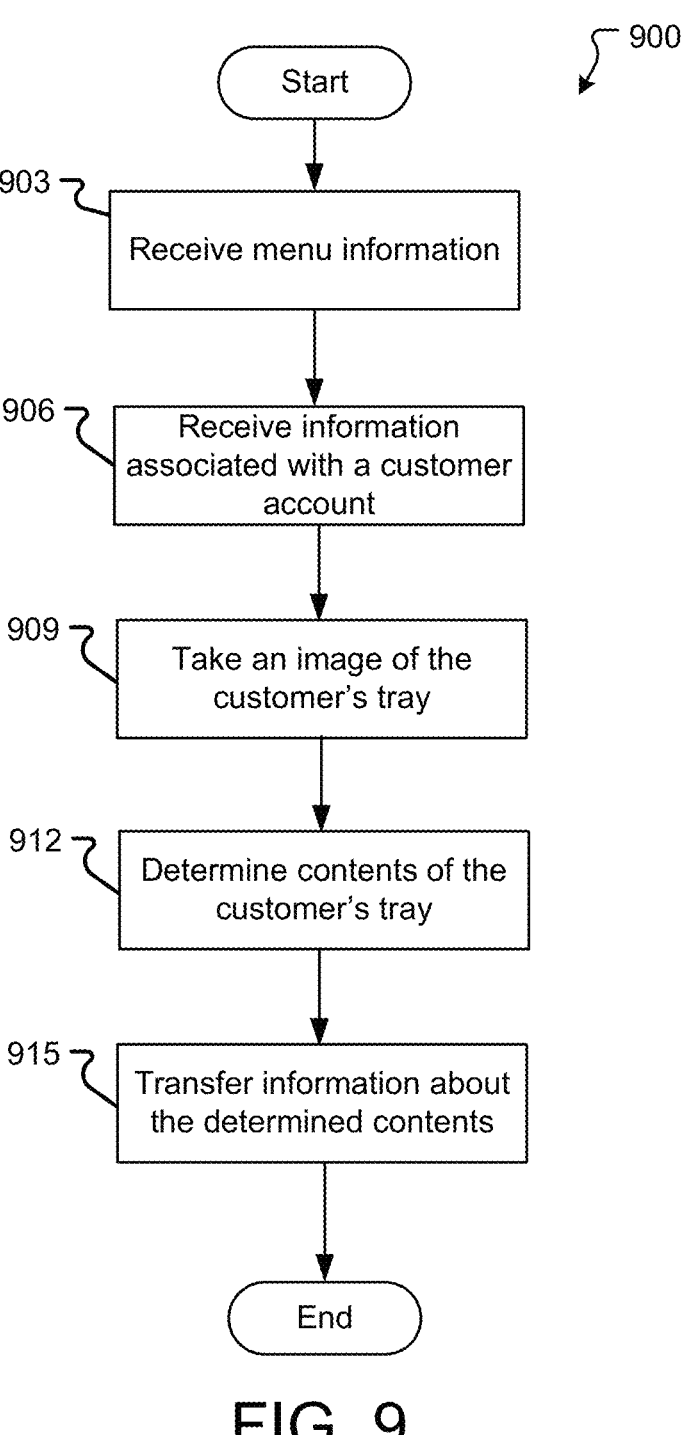
FIG. 9 is a flow diagram of a process for identifying and processing a meal using the self-checkout system of the school food and beverage recognition and processing system in accordance with embodiments of the present disclosure.

FIG. 9 is a flow diagram of a process for identifying and processing a meal using the self-checkout system of the school food and beverage recognition and processing system in accordance with embodiments of the present disclosure. In embodiments, the self-checkout system 100 may perform all or a portion of the method 900 to identify and process a meal. In embodiments, a portion of the method 900 may be performed by the self-checkout system 100 and another portion of the method 900 may be performed by another system (e.g., the processing system 806). The method 900 may begin at step 903 when the self-checkout system 100 receives menu information. In embodiments, the menu information may be retrieved from a database (e.g., the database 820). From example, the self-checkout system 100 may request over the internet menu information from the school district. In embodiments, the menu information may be inputted. For example, menu information may be transferred to the self-checkout system 100 via a thumb drive that is connected to the self-checkout system 100. Once transferred, the menu information may be stored locally (e.g., memory 208). In embodiments, the menu information may be retrieved/transferred from a third-party (e.g., nutritional provider) to the self-checkout system 100.

At step 906 the self-checkout system 100 receives information associated with a customer account. In embodiments, the self-checkout system 100 uses a front facing camera to take an image of the customer and uses image recognition software to identify the customer. For example, the school may have a database of images for all students, and the image taken is compared against the database of student images to identify the student. Students or their parents may opt-in or out of using the image recognition, and may be provided with alternate means of identification. In embodiments, the customer may enter a PIN or scan an RF ID card that uniquely identifies the customer in the system.

At step 909 an image of the customer's tray is taken. In embodiments, the self-checkout system 100 may take multiple images and process the multiple images to select at least one image to be used to determine the contents of the customer's tray at step 912. For example, some of the images may be blurry or not show the entire tray, and by taking multiple images, the self-checkout system 100 can select the best image (e.g., clearest with all items displayed) to use.

At step 912 the contents of the customer's tray is determined. In other words, the self-checkout system 100 uses the image of the customer's tray to determine which food/beverage items the customer purchased. In embodiments, the menu information retrieved in step 903 is used to generate a list of possible items. That is to say on a given date/time only a subset of possible menu items will be available, and some menu items may look similar to other menu items (e.g., a tomato and an orange). By generating a list of possible items for a given date/time, the system is able to reduce the processing required to determine the contents of a customer's tray. For example, the possible list of items for Aug. 16, 2024, may be pepperoni pizza, macaroni and cheese, an apple, broccoli, milk (regular or chocolate), and apple juice. In this example, the possible list of items is seven, instead of the hundreds or even thousands of menu items that may be served over the course of a school year.

At step 915 information about the determined contents is transferred. For example, if the processing to determine the contents of a customer's tray is performed by the processing system 806, information about the determined contents may be transferred back to the location 818 or to another entity (e.g., school district). The information may include information regarding whether the meal is reimbursable or not. The information may include whether the customer's tray includes a restricted item (e.g., due to an allergy the customer cannot consume peanuts, an item that includes peanuts may be restricted for that customer. The information may include an indication that the customer's tray includes improper portions (e.g., two portions of a main entrée). The information may indicate that a usable image was not captured, and the image needs to be retaken. The information may be used to provide visual/audio alerts, and different alerts may be used for different indications. In embodiments, the processing may be done locally and the step 915 is omitted.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed embodiments, configuration, and aspects.

Figure 10:
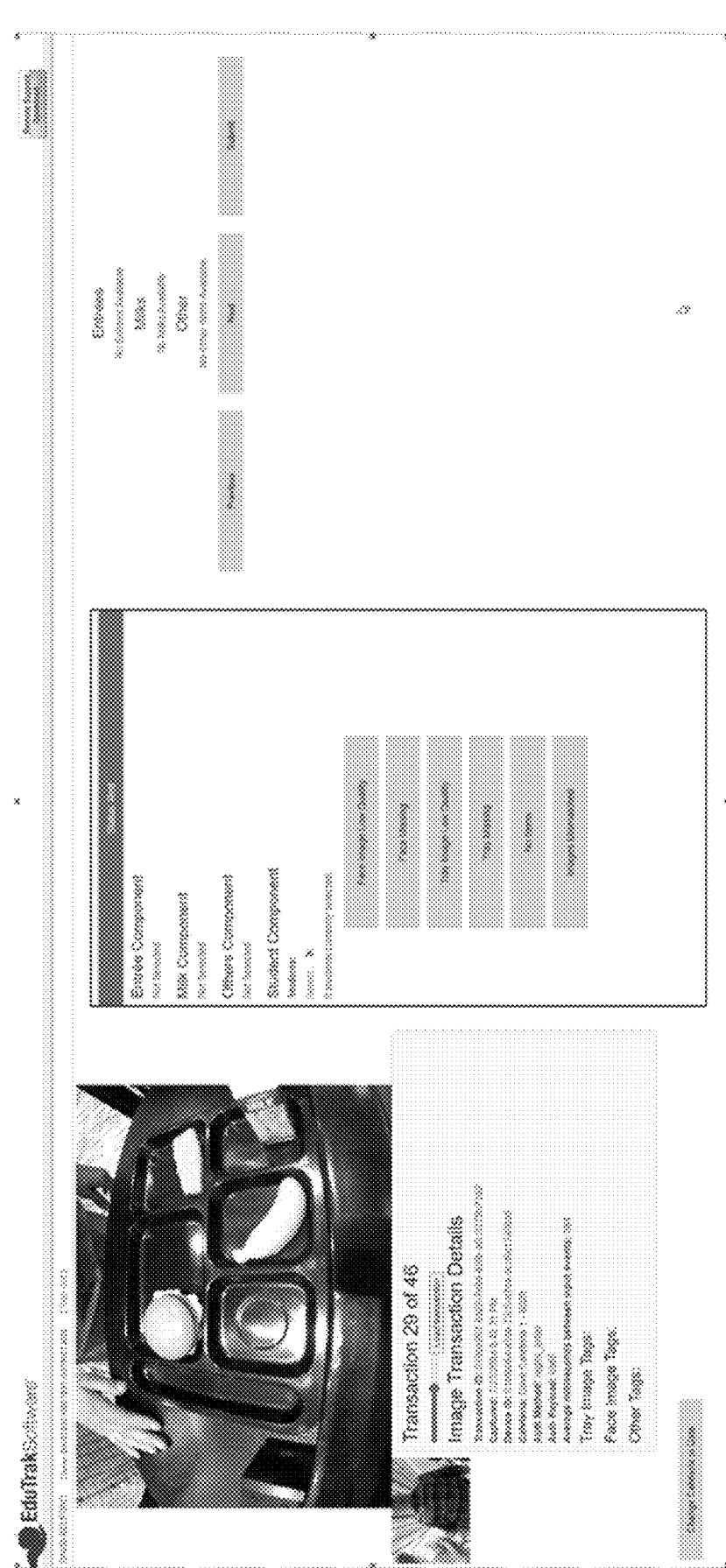
FIG. 10 illustrates an example user interface for the self-checkout system in accordance with embodiments of the present disclosure.

FIG. 10 illustrates an example user interface (UI) 1000 for the self-checkout system in accordance with embodiments of the present disclosure. In embodiments, the UI 1000 may be used to review AI processed meals for auditing, quality assurance, to generate training data to train/retrain an AI model used to determine the contents of a customer's tray, etc.

The exemplary systems and methods of this disclosure have been described in relation to school meal identification and processing systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Exemplary aspects are directed to a self-checkout system for school meals, comprising: a frame configured to mount to a school meal line, the frame extending a width from a first side of the self-checkout system to a second side of the self-checkout system, the frame extending a frame height from a base surface of the frame to an upper surface of the frame; a support arm attached to the upper surface of the frame and extending an arm height from the upper surface of the frame in a direction away from the base surface of the frame; a head unit attached to the support arm, the head unit comprising: a forward image sensor arranged at least partially inside the head unit; and a downward image sensor arranged at least partially inside the head unit, wherein the forward image sensor and the downward image sensor are each disposed on a front side of the head unit, wherein the forward image sensor comprises a first field of view comprising a lower height limit and an upper height limit measured from a floor, wherein the downward image sensor comprises a second field of view that encompasses a tray viewing area arranged below the lower height limit, and wherein the tray viewing area is arranged adjacent the base surface of the frame; a tray detection sensor comprising a sensing area within the tray viewing area; and a controller, comprising: a processor; and a memory coupled with and readable by the processor and storing therein instructions that, when executed by the processor, cause the processor to: detect, by the tray detection sensor, when a tray enters the sensing area within the tray viewing area: capture, in response to detecting when the tray enters the sensing area, the forward image sensor to capture an image of a user within the first field of view; activate, in response to detecting when the tray enters the sensing area, the downward image sensor to capture an image of the tray within the tray viewing area; and store the image of a user and the image of the tray as captured by the forward image sensor and the downward image sensor, respectively, with an association between the user and the tray.

Any one or more of the above aspects include wherein the instructions, when executed by the processor, further cause the processor to: identify, based on the image of the tray, contents of a meal associated with the tray and the user. Any one or more of the above aspects include wherein the instructions, when executed by the processor, further cause the processor to: determine, based on meal qualification rules stored in the memory, whether a meal associated with the image of the tray is reimbursable under a school lunch program. Any one or more of the above aspects further comprising: a visual indicator arranged at least partially inside the head unit and comprising at least one light emitting diode; and an audio output device arranged at least partially inside the head unit and comprising at least one speaker. Any one or more of the above aspects include wherein the instructions, when executed by the processor, further cause the processor to: determine, based on the image of the tray within the tray viewing area, that at least a portion of the tray is outside of the tray viewing area; and emit, by at least one of the visual indicator and the audio output device, an instruction to the user to arrange the tray entirely within the tray viewing area. Any one or more of the above aspects include wherein the instructions, when executed by the processor, further cause the processor to: send, across a communication network, information about the user and the tray to a server for further processing. Any one or more of the above aspects include wherein the instructions, when executed by the processor, further cause the processor to: retrieve menu information for meals processed by the self-checkout system from a memory location of a computer-readable memory storage device, wherein identifying the contents of the meal associated with the tray and the user is based on the menu information retrieved. Any one or more of the above aspects further comprising: a head cover attached to the head unit and covering an outer surface of the head unit, wherein the head cover includes a decoration applied to an outer surface of the head cover. Any one or more of the above aspects include wherein the decoration includes features of an illustrated face, and wherein at least one of the features of the illustrated face align with at least one of the forward image sensor and the downward image sensor. Any one or more of the above aspects include wherein the head cover is made from a neoprene material, and wherein the neoprene material comprises a wall thickness surrounding an outer circumferential surface of the head unit.

Exemplary aspects are directed to a self-checkout method, comprising: receiving menu information; receiving information associated with a customer account; taking an image of a tray of a customer, wherein the customer is associated with the customer account; storing the information associated with the customer account and the image of the tray of the customer; determining contents of the tray of the customer using the image of the tray of the customer and the menu information; and sending information about the determined contents to a recipient.

Any one or more of the above aspects include further comprising: transferring the stored information to a processing system, wherein the processing system determines the contents of the tray of the customer using the image of the tray of the customer and the menu information. Any one or more of the above aspects include wherein the menu information comprises information about food and/or beverage offered for a given time of day and a date. Any one or more of the above aspects include wherein determining the contents of the tray of the customer includes using the menu information to generate a list of possible items and using image recognition software to compare the contents of the tray of the customer with the list of possible items to determine food and/or beverage purchased by the customer. Any one or more of the above aspects include wherein sending the information about the determined contents to the recipient includes sending a determination of whether the determined contents are reimbursable. Any one or more of the above aspects include wherein receiving information associated with the customer account includes taking an image of the customer and using image recognition software to identify the customer. Any one or more of the above aspects include wherein taking the image of the tray of the customer includes taking a plurality of images within a predetermined time period, and wherein the plurality of images are processed to select at least one image to use in determining the contents of the tray of the customer. Any one or more of the above aspects further comprising: providing alerts based on the determined contents. Any one or more of the above aspects include wherein a first alert is provided when the determined contents is not reimbursable, wherein a second alert is provided when the determined contents includes a restricted item, and wherein a third alert is provided when the determined contents has improper portions.

Exemplary aspects are directed to a system comprising one or more circuits to: receive menu information; receive information associated with a customer account; take an image of a tray of a customer, wherein the customer is associated with the customer account; determine contents of the tray of the customer using the image of the tray of the customer and the menu information; and send information about the determined contents to a recipient.

Any one or more of the above aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate," "compute," and variations thereof, as used herein, are used interchangeably and include any type of methodology, process, mathematical operation, or technique.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A self-checkout system for school meals in a reimbursable school meal program, comprising:

a frame configured to mount to a school meal line, the frame extending a width from a first side of the self-checkout system to a second side of the self-checkout system, the frame extending a frame height from a base surface of the frame to an upper surface of the frame;

a support arm attached to the upper surface of the frame and extending an arm height from the upper surface of the frame in a direction away from the base surface of the frame;

a head unit attached to the support arm, the head unit comprising:

a forward image sensor arranged at least partially inside the head unit; and a downward image sensor arranged at least partially inside the head unit, wherein the forward image sensor and the downward image sensor are each disposed on a front side of the head unit, wherein the forward image sensor comprises a first field of view comprising a lower height limit and an upper height limit measured from a floor, wherein the downward image sensor comprises a second field of view that encompasses a tray viewing area arranged below the lower height limit, and wherein the tray viewing area is arranged adjacent the base surface of the frame;

a tray detection sensor comprising a sensing area within the tray viewing area;

a processor; and a memory coupled with and readable by the processor and storing therein instructions that, when executed by the processor, cause the processor to:

detect when a tray enters the sensing area within the tray viewing area;

in response to detecting when the tray enters the sensing area;

activate the forward image sensor to capture an image of a user associated with the tray within the first field of view; and activate the downward image sensor to capture an image of the tray within the tray viewing area;

identify, based on the image of the user, the user associated with the tray;

retrieve menu information for items available to the user on the date and time at which the image of the tray was captured;

identify, based on the image of the tray and the menu information, items present on the tray as among the items available to the user on the date and time at which the image of the tray was captured; and determine whether the items identified as being present on the tray constitute a school meal eligible for reimbursement according to meal qualification rules of the reimbursable school meal program.

2. The self-checkout system of claim 1, further comprising:

a visual indicator arranged at least partially inside the head unit and comprising at least one light emitting diode; and an audio output device arranged at least partially inside the head unit and comprising at least one speaker.

3. The self-checkout system of claim 2, wherein the instructions, when executed by the processor, further cause the processor to:

determine, based on the image of the tray within the tray viewing area, that at least a portion of the tray is outside of the tray viewing area; and activate at least one of the visual indicator and the audio output device to emit an instruction to the user to arrange the tray entirely within the tray viewing area.

4. The self-checkout system of claim 1, wherein the instructions, when executed by the processor, further cause the processor to send, across a communication network, information about the user and the tray to a server for further processing.

5. The self-checkout system of claim 1, further comprising a head cover attached to the head unit and covering an outer surface of the head unit, wherein the head cover includes a decoration applied to an outer surface of the head cover.

6. The self-checkout system of claim 5, wherein the decoration includes features of an illustrated face, and wherein at least one of the features of the illustrated face align with at least one of the forward image sensor and the downward image sensor.

7. The self-checkout system of claim 5, wherein the head cover is made from a neoprene material, and wherein the neoprene material comprises a wall thickness surrounding an outer circumferential surface of the head unit.

8. A self-checkout method for school meals in a reimbursable school meal program, comprising:

identifying a user associated with a tray based on an image of the user captured contemporaneously with an image of the tray;

receiving menu information for menu items available to the user on the date and time at which the image of the tray was captured;

identifying, based on the image of the tray and the menu information, items present on the tray as among the items available to the user on the date and time at which the image of the tray was captured;

determining whether the items identified as being present on the tray constitute a school meal eligible for reimbursement according to meal qualification rules of the reimbursable school meal program; and sending information about the identified items to a recipient.

9. The self-checkout method of claim 8, further comprising:

storing information associated with the image of the user and the image of the tray in a memory accessible by a processing system; and transferring the stored information to the processing system for one or both of:

identifying the user associated with the tray; and determining whether the items identified as being present on the tray constitute the school meal eligible for reimbursement.

10. The self-checkout method of claim 8, wherein identifying the items present on the tray comprises comparing, using an image recognition algorithm, the items present on the tray with images of the items available to the user on the date and time at which the image of the tray was captured.

11. The self-checkout method of claim 10, wherein comparing the items present on the tray with images of the items comprises:

selecting one or more images of the tray from among a plurality of contemporaneously captured images of the tray for use in identifying the items present on the tray; and comparing the selected one or more images of the tray with the images of the items available to the user on the date and time at which the image of the tray was captured.

12. The self-checkout method of claim 8, wherein sending the ifnormaiton about the identified items to the recipient comprises sending a determination of whether the identified items are reimbursable.

13. The self-checkout method of claim 8, wherein identifying the user associated with the tray comprises applying a facial recognition algorithm to the image of the user.

14. The self-checkout method of claim 8, further comprising providing alerts based on an outcome of determining whether the items identified as being present on the tray constitute the school meal eligible for reimbursement.

15. The self-checkout method of claim 14, wherein determining whether the items identified as being present on the tray constitute the school meal eligible for reimbursement comprises determining that the items present on the tray include a restricted item, an improper portion, or an item that the user is allergic to, and wherein the providing alerts based on an outcome of determining whether the items identified as being present on the tray constitute the school meal eligible for reimbursemnt comprises:

providing a first alert when the outcome of the determining step is that the items present on the tray do not constitute a reimbursable school meal;

providing a second alert when the outcome of the determining step is that the items present on the tray include a restricted item;

providing a third alert when the outcome of the determining step is that the items present on the tray include an improper portion; and providing a fourth alert when the outcome of the determining step is that the items present on the tray include an item that the user is allergic to.

16. The method of claim 8, wherein identifying the items present on the tray as among the items available to the user on the date and time at which the image of the tray was captured comprises providing the image of the tray to an artificial intelligence (AI) object recognition model trained to identify the items present on the tray using a library of images labeled in accordance with pre-identified food or beverage items depicted in the images of the library.

17. The method of claim 16, wherein determining whether the items present on the tray constitute the school meal eligible for reimbursement comprises:

providing, to the AI object recognition model, labeled images for each item of the items available to the user on the date and time at which the image of the tray was captured, wherein the AI object recognition model is further trained to identify the items present on the tray using only a subset of images of the library having labels corresponding to the items available to the user on the date and time at which the image of the tray was captured;

receiving, from the AI object recognition model, an identity of each item present on the tray; and determining whether data representative of a listing of identities of the items present on the tray received from the AI object recognition model includes a sufficient number of different items to constitute the school meal eligible for reimbursement.

18. The method of claim 17, wherein the AI object recognition model is further trained to assign a confidence score to the identification of each item present on the tray, wherein receiving the identity of each present on the tray comprises receiving the confidence score associated with the identification by the AI object recognition model of each item on the tray, and wherein the method further comprises identifying any of the items identified by the AI object recognition model having a confidence score not meeting a threshold; and routing the image of the tray for human review for manual identification of those items present on the tray having confidences scores not meeting the threshold.

19. The method of claim 18, further comprising training the AI object recognition model using results of the manual identification.

20. A system comprising one or more circuits to:

identify a user associated with a tray based on an image of the user captured contemporaneously with an image of the tray;

receive menu information for menu items available to the user on the date and time at which the image of the tray was captured;

identify, based on the image of the tray and the menu information, items present on the tray as among the items available to the user on the date and time at which the image of the tray was captured;

determine whether the items identified as being present on the tray constitute a school meal eligible for reimbursement according to meal qualification rules of a reimbursable school meal program; and send information about the identified items to a recipient.

\* \* \* \* \*